US008755510B2

(12) United States Patent
Erbey et al.

(10) Patent No.: US 8,755,510 B2
(45) Date of Patent: *Jun. 17, 2014

(54) METHODS AND SYSTEMS FOR PROVIDING CUSTOMER RELATIONS INFORMATION

(76) Inventors: William C. Erbey, Palm Beach, FL (US); Scott Paul Conradson, Maitland, FL (US)

(*) Notice: Subject to any disclaimer, the term of this patent is extended or adjusted under 35 U.S.C. 154(b) by 573 days.

This patent is subject to a terminal disclaimer.

(21) Appl. No.: 13/035,859

(22) Filed: Feb. 25, 2011

(65) Prior Publication Data

US 2011/0208660 A1     Aug. 25, 2011

Related U.S. Application Data

(63) Continuation of application No. 10/918,699, filed on Aug. 16, 2004, now abandoned.

(60) Provisional application No. 60/495,085, filed on Aug. 15, 2003.

(51) Int. Cl.
*H04M 3/00* (2006.01)
*G06Q 40/02* (2012.01)
*H04M 3/51* (2006.01)
*G06Q 30/00* (2012.01)
*G06Q 40/00* (2012.01)

(52) U.S. Cl.
CPC ............... *G06Q 40/02* (2013.01); *H04M 3/51* (2013.01); *G06Q 30/016* (2013.01); *G06Q 40/00* (2013.01)
USPC .................................................. 379/265.02

(58) Field of Classification Search
CPC ....................................................... H04M 3/51
USPC ............. 379/265.02, 265.11, 265.13, 265.01
See application file for complete search history.

(56) References Cited

U.S. PATENT DOCUMENTS

| | | | |
|---|---|---|---|
| 4,797,911 A | 1/1989 | Szlam et al. |
| 5,594,638 A | 1/1997 | Iliff |
| 5,737,726 A | 4/1998 | Cameron et al. |
| 5,889,799 A | 3/1999 | Grossman et al. |
| 5,960,073 A | 9/1999 | Kikinis et al. |
| 6,098,052 A | 8/2000 | Kosiba et al. |
| 6,195,426 B1 | 2/2001 | Bolduc et al. |
| 6,453,299 B1 | 9/2002 | Wendkos |
| 6,574,605 B1 | 6/2003 | Sanders et al. |

(Continued)

OTHER PUBLICATIONS

Office Action, dated Jul. 25, 2013, from corresponding U.S. Appl. No. 13/039,141.

(Continued)

*Primary Examiner* — Sonia Gay

(57) ABSTRACT

Methods and systems for providing information to a mortgage recipient or other customer of a financial institution. A system identifies potential customer inquiries and provides a list of scripts responsive to the potential customer inquiries. If none of the scripts address the customer's inquiry, the customer specifies the inquiry and an additional list of scripts is generated. The scripts include scripted text, account information, and financial transaction information. In one variation, the customer accesses a website maintained by the financial institution and views a script responsive to the inquiry. In another variation, the customer telephones a customer service agent who selects a script responsive to the inquiry, and reads the script to the customer. In yet another variation, the script is provided to the customer via an Interactive Voice Response system.

17 Claims, 21 Drawing Sheets

(56) References Cited

U.S. PATENT DOCUMENTS

| | | | |
|---|---|---|---|
| 6,587,556 B1 | 7/2003 | Judkins et al. | |
| 6,603,852 B2 * | 8/2003 | Saito et al. | 379/265.01 |
| 6,639,982 B1 | 10/2003 | Stuart et al. | |
| 6,763,104 B1 | 7/2004 | Judkins et al. | |
| 6,782,091 B1 | 8/2004 | Dunning, III | |
| 6,798,876 B1 * | 9/2004 | Bala | 379/265.13 |
| 6,819,759 B1 | 11/2004 | Khuc et al. | |
| 6,912,272 B2 | 6/2005 | Kirk et al. | |
| 7,103,562 B2 | 9/2006 | Kosiba et al. | |
| 7,158,628 B2 | 1/2007 | McConnell et al. | |
| 7,191,150 B1 | 3/2007 | Shao et al. | |
| 7,203,285 B2 | 4/2007 | Blair | |
| 7,386,467 B2 | 6/2008 | Eitel et al. | |
| 7,472,089 B2 | 12/2008 | Hu et al. | |
| 7,558,756 B1 | 7/2009 | Wesly et al. | |
| 7,680,728 B2 | 3/2010 | Lazerson | |
| 8,117,117 B2 | 2/2012 | Hu et al. | |
| 8,458,074 B2 | 6/2013 | Showalter | |
| 8,489,498 B1 | 7/2013 | Flaxman et al. | |
| 8,521,631 B2 | 8/2013 | Abrahams et al. | |
| 8,595,130 B2 | 11/2013 | Johnson et al. | |
| 8,600,876 B2 | 12/2013 | Smith et al. | |
| 2001/0040892 A1 | 11/2001 | Spencer | |
| 2001/0054064 A1 | 12/2001 | Kannan | |
| 2002/0009190 A1 | 1/2002 | McIllwaine et al. | |
| 2002/0022986 A1 | 2/2002 | Coker et al. | |
| 2002/0152288 A1 | 10/2002 | Hora et al. | |
| 2003/0078881 A1 | 4/2003 | Elliott et al. | |
| 2003/0086557 A1 | 5/2003 | Shambaugh et al. | |
| 2003/0179877 A1 | 9/2003 | Dezonno et al. | |
| 2003/0190021 A1 | 10/2003 | Hornsby | |
| 2004/0015425 A1 | 1/2004 | O'Neill | |
| 2004/0042611 A1 | 3/2004 | Power et al. | |
| 2004/0042612 A1 | 3/2004 | Michelson et al. | |
| 2004/0059596 A1 | 3/2004 | Vaidyanathan et al. | |
| 2004/0062364 A1 | 4/2004 | Dezonno et al. | |
| 2004/0109557 A1 | 6/2004 | Lenard | |
| 2004/0162773 A1 | 8/2004 | Del Rey et al. | |
| 2004/0234065 A1 | 11/2004 | Anderson | |
| 2005/0053224 A1 * | 3/2005 | Pennington et al. | 379/265.09 |
| 2005/0160142 A1 | 7/2005 | Whitman | |
| 2005/0195961 A1 | 9/2005 | Pasquale et al. | |
| 2006/0062376 A1 | 3/2006 | Pickford | |
| 2006/0095273 A1 * | 5/2006 | Montvay et al. | 705/1 |
| 2006/0179011 A1 | 8/2006 | Latz | |
| 2007/0043661 A1 | 2/2007 | Kass et al. | |
| 2009/0132365 A1 | 5/2009 | Gruenhagen et al. | |
| 2009/0171668 A1 | 7/2009 | Sneyders et al. | |
| 2010/0324966 A1 | 12/2010 | Neuweg et al. | |

OTHER PUBLICATIONS

Final Office Action, dated May 21, 2009, from corresponding U.S. Appl. No. 11/141,209.

Final Office Action, dated Sep. 2, 2010, from corresponding U.S. Appl. No. 11/141,209.

Office Action, dated Dec. 11, 2009, from corresponding U.S. Appl. No. 11/141,209.

Office Action, dated Oct. 3, 2008, from corresponding U.S. Appl. No. 11/141,209.

Related Case—U.S. Appl. No. 13/039,141, filed Mar. 2, 2011, entitled "Call Center Services System and Method," now Publication No. 20110150206.

"Call Center Demos", Database Systems Corp. Call Center Technology, <http://www.databasesystemscorp.com/demonstrations.htm> (Jan. 2005).

"New Century Mortgage Combines Contact Center Solutions for Maximized Performance", <http://www.contactcenterworld.com/news.asp?request=1&NewsItemID={5F104E03>. . (Jul. 2, 2004).

James Swann, "Making the connection: How technology integrates call centers", Community Banker, Washington: Jul. 2003, vol. 12, iss. 7, p. 34 [ISSN/ISBN: 15291332 and Proquest document ID: 370884771.

Maria Bruno, "Buying Q-Up Puts S1 Tops in NT Systems With its latest buy, S1 Corp. is setting its sights on the small bank market", Bank Technology News. New York: May 8, 2000, vol. 14, iss. 5, p. 33.

Trevor Thomas "CRM systems help analyze workflow, profile customers", National Underwriter. (Life, health/financial services ed.) Erlanger. Oct. 21, 2002, vol. 106, iss. 42; p. 11, 2 pgs.

Bob Gdovic, "Calling all customers" Bank Marketing. Washington: May 2001, vol. 3, is. 4, p. 32, 5 pgs.

Paul Prabhaker et al., "The power of technology in business selling: call centers" The Journal of Business & Industrial Marketing. Santa Barbara: 1997, vol. 12, iss. 3/4; p. 222.

Merly Davids, "How to avoid the 10 biggest mistakes in CRM", The Journal of Business Strategy, Boston: Nov./Dec. 1999, vol. 20, iss. 6, p. 22, 5 pgs.

Office Action, dated Nov. 28, 2012, from corresponding U.S. Appl. No. 13/039,141.

Office Action, dated Oct. 22, 2012, from corresponding U.S. Appl. No. 12/731,888.

Final Office Action, dated Aug. 1, 2012, from corresponding U.S. Appl. No. 12/731,888.

Office Action, dated Dec. 23, 2011, from corresponding U.S. Appl. No. 12/731,888.

PCT International Search Report, dated Jul. 17, 2012, from corresponding PCT Application Serial No. PCT/US2012/33089.

Related Case—U.S. Appl. No. 12/731,888, filed Mar. 25, 2010, entitled "Method and System for an Integrated Approach to Collections Cycle Optimization." .

Related Case—U.S. Appl. No. 13/443,618, filed Apr. 10, 2012, entitled "System and Methods for Optimizing Customer Communications." .

Written Opinion of the International Searching Authority, dated Jul. 17, 2012, from corresponding PCT Application Serial No. PCT/US/2012/33089.

Final Office Action, dated May 8, 2013, from corresponding U.S. Appl. No. 13/039,141.

Notice of Allowance, dated Apr. 9, 2013, from corresponding U.S. Appl. No. 12/731,888.

Simpson, B. (2001). A not-so-simple labor market. Credit Card Management, 14(8), 52-60. Retrieved Mar. 29, 2013.

Notice of Allowance, dated Jan. 31, 2014, from corresponding U.S. Appl. No. 13/039,141.

Office Action, dated Jan. 6, 2014, from corresponding U.S. Appl. No. 13/923,601.

* cited by examiner

1800

METHODS AND SYSTEMS FOR PROVIDING CUSTOMER RELATIONS INFORMATION

This application is a Continuation of U.S. patent application Ser. No. 10/918,699, filed Aug. 16, 2004, which claims priority to U.S. Provisional Application No. 60/495,085, filed Aug. 15, 2003. The entirety of this patent application is incorporated herein by reference.

BACKGROUND OF THE INVENTION

1. Field of the Invention

The present invention relates to expert methods and systems for providing customer relations information via the Internet, an interactive automated response system, or an automated expert system accessed by a user.

2. Background of the Technology

Customers of service providers, such as lenders or other financial service providers, frequently inquire about their services, including changes in cost, fee structure, and benefits, for example. Inquiries cover a broad range of issues and may be extremely complex. In the financial lending industry, topics include, for example, current status of rates and balances, changes in rates, financial strategies, and general requests for information. For instance, a customer may inquire about the increase in an adjustable mortgage rate, the maximum rate of the mortgage, and the trends observed in the market.

The customer relations departments of service providers typically are trained to respond to a variety of customer inquiries. However, often customer inquiries exceed the expertise of customer relations agents. Moreover, customer relations agents have the difficult, and sometimes impossible, task of identifying, researching, and solving every issue posed by the customer. As a result, customers may not receive informative, responsive, or complete answers to their inquiries. Even in those cases in which agents properly provide information to customers, often the information is not delivered in a timely manner.

It is well known in the field that customer relations agents may rely on prepared texts or electronic repositories for answers to customer questions. However, these resources are typically cumbersome, inefficient, and time-consuming to research.

There remains an unmet need for service providers, such as financial lenders, to assess efficiently customer issues, and then subsequently answer them completely, accurately, and consistently. Further, there is an unmet need for methods and systems for consistently documenting the results of a conversation with a customer and for providing supporting information to allow an action to be taken by a customer relations agent in a predetermined format. Additionally, there is an unmet need for methods and systems for some customers to avoid agents and directly access personal information to answer, address, and resolve questions and issues.

There thus remains a general unmet need for an expert method and system for providing customer relations information that can assess and deliver comprehensive and responsive information to the customer in a timely and cost-effective manner.

SUMMARY OF THE INVENTION

The present invention meets these needs, as well as others, by providing a method and system for developing customer relations information, in any field, including finance, banking, and insurance, to customers (also referred to interchangeably herein as "users" and "inquiring parties"). For example, in an embodiment of the present invention, the customer contacts an agent employed by a customer relations department to discuss his/her account, records, or stored information. The agent accesses the customer's personal information stored in an electronic database or other repository. Either the customer or the agent raises a particular issue regarding the customer's account.

The Customer Relation's Expert ("CRE") feature of the present invention analyzes the customer's account and determines an appropriate script for the agent, who provides relevant information to the customer. The appropriate script is generated based on logical parameters, as well as identification and prioritization methods developed based on previous cases, inquiries, and experience. When the customer's account is changed by the customer, the system administrator, or another party, the CRE generates updated scripts reflecting issues arising from the changes to the account. In one embodiment of the invention, additional scripts are available for issues that cannot be predicted by the CRE. In such cases, the agent selects a category and enters key words to receive the appropriate script(s).

In another embodiment of the present invention, the customer contacts a source of information on a network, such as a server for web site on the Internet or the World Wide Web, of a business in which the customer maintains an account, records, or stored information. In yet another embodiment, the customer accesses an Interactive Voice Response (IVR) or other automated interactive system. The customer verifies his/her identity to gain access to the site/system. The site/system then receives inquiries from the customer, which, in turn, trigger the CRE to analyze the appropriate databases and to provide the appropriate script to address the customer's inquiry. Alternatively, the CRE is triggered automatically upon the verification of the customer's identity, whereby the CRE analyzes predicted or likely issues concerning the customer's account and generates an applicable script.

Thus, the present invention provides methods and systems for providing responsive, comprehensive, accurate, and efficient, customer relations to customers seeking information regarding their account.

Additional advantages and novel features of the invention will be set forth in part in the description that follows, and in part will become more apparent to those skilled in the art upon examination of the following or upon learning by practice of the invention.

DETAILED DESCRIPTION OF THE INVENTION

The present invention, referred to in one embodiment as a Customer Relations Expert ("CRE"), includes an expert system providing intelligent automation to access and process existing informational database or other repository information, such as customer servicing information (e.g., REALServicing™), and for providing customer relations processes via live agents, a network, such as the Internet (also referred to interchangeably herein as the "World Wide Web" or the "web"), or an Interactive Voice Response ("IVR") or other automated interactive system.

In one embodiment of the present invention, a request is sent to the CRE system whenever an inquiry is received by the agent of a customer relations department, and the CRE automatically presents the agent with scripts representing the most probable reason for the inquiry. In another embodiment of the present invention, the agent manually invokes the CRE. Alternatively, a network user (e.g., customer) logs into the network and manually invokes the CRE. In yet another variation, a user accesses the system via a communication device and an IVR interface, such as a telephone. In each of these variations, the CRE system then identifies the most likely issues responsive to the inquiry.

In one embodiment, the invention is comprised of several components and cooperative counterparts, including, for example, the CRE Engine, an Engine Service Provider ("ESP"), and a CRE-Web adapter that generally communicates with the web, for example, using an agent software application such as "WebSpeed," made by Progress Software Corporation of Bedford, Mass. The CRE Engine contains all of the logic necessary to gather the required data and compute a response to an inquiry. For each inquiry, the CRE Engine initiates the software agent to retrieve data from an existing database, such as REALServicing™, made by Ocwen of West Palm Beach, Fla., via an electronic interface, such as telecommunications protocol/internet protocol ("TCP/IP") sockets. The components and cooperative counterparts communicate following what is generally known in the field as a "handshake" process.

In one embodiment, REALServicing™ comprises a Progress database, which allows access to and updates of client data in a repository, and the REALServicing™ Client, which in one variation includes a GUI desktop application used by customer relations agents to view and update customer loan information. One embodiment of the present invention incorporates various aspects of applicant's copending U.S. patent application Ser. No. 10/729,019, titled "Electronic Ordering, Invoice Presentment, and Payment System and Method," filed Dec. 8, 2003, which is incorporated herein by reference.

Figure 1:
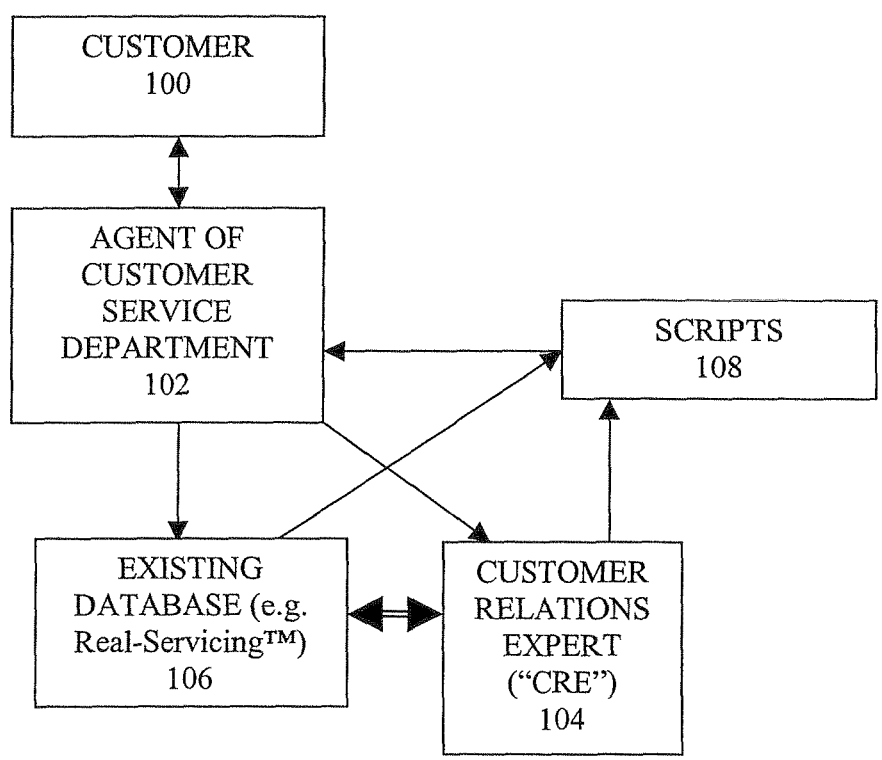
FIG. 1 is an overview flow diagram of a method and system for providing customer relations information to inquiring parties addressing issues via an agent affiliated with a customer relations department, in accordance with an embodiment of the present invention.

FIG. 1 presents an overview flow diagram of a method and system for providing customer relations information to inquiring parties addressing issues via an agent affiliated with a customer relations department, in accordance with an embodiment of the present invention. As shown in FIG. 1, a customer or other user 100 contacts an agent 102 of a customer service department. The customer 100 contacts the agent 102, for example, via telephone or other appropriate communication device or medium. The customer 100 may, for example, initiate the contact to make an inquiry.

The agent 102 activates a CRE Engine 104. This includes, for example, inputting customer information into the CRE Engine 104. The CRE Engine 104 contains logic necessary to gather the required data and compute a response to an inquiry. If the customer 100 has made an inquiry, the CRE Engine 104 computes the response to the customer's inquiry. Alternatively, the CRE Engine 104 identifies likely inquiries and computes responses to each. For each inquiry, the CRE Engine 104 initiates a software agent (not shown in FIG. 1) to retrieve data from an existing database 106, such as REALServicing™, via an electronic interface, such as telecommunications protocol/internet protocol ("TCP/IP") sockets. The components and cooperative counterparts communicate following what is generally known in the field as a "handshake" process. The existing database 106, for example, allows access to and updates of client data in a repository. The existing database 106 also includes, for example, a GUI desktop application used by customer relations agents to view and update customer loan information.

In one embodiment, data is retrieved using a software agent accessing a repository using an electronic or other connection, such as or including access via a network. The CRE Engine 104 receives the data and parses it using logic principles, such as Boolean parameters, and then subsequently classifies the issues of the inquiry.

In the classification step, the CRE Engine 104 identifies the most likely issues associated with the inquiry. This is based on Case Based Reasoning (CBR), which involves matching the object of the inquiry against the Case Base of Issues. The Case Base includes a repository of defined scenarios, referred to as stored cases. Each stored case represents a collection of data, such as loan characteristics, that can be used to determine when a particular issue exists. Conceptually, in one embodiment, classification involves two steps: 1) Case Based Matching, which produces a list of issues (e.g., a pre-determined list of database information relevant to each inquiry), with a match score, for example, that match the presented inquiry; and 2) Match Filtering, which includes filtering of matched cases and suppressing cases in the event that a particularly overriding case is found.

After classification, in one variation of the present invention, the CRE Engine 104 provides suggested scripts 108 for each matched issue, which are prioritized, for example, by rank or score that corresponds to the probability of a match. The scripts 108 are incorporated in a readable document, and one or more scripts 108 is sent to the customer 100 via the agent 102. This includes, for example, the agent 102 reading a script to the customer 100 over the telephone, electronically transmitting the script to the customer 100, or providing the script according to another appropriate method.

Figure 2:
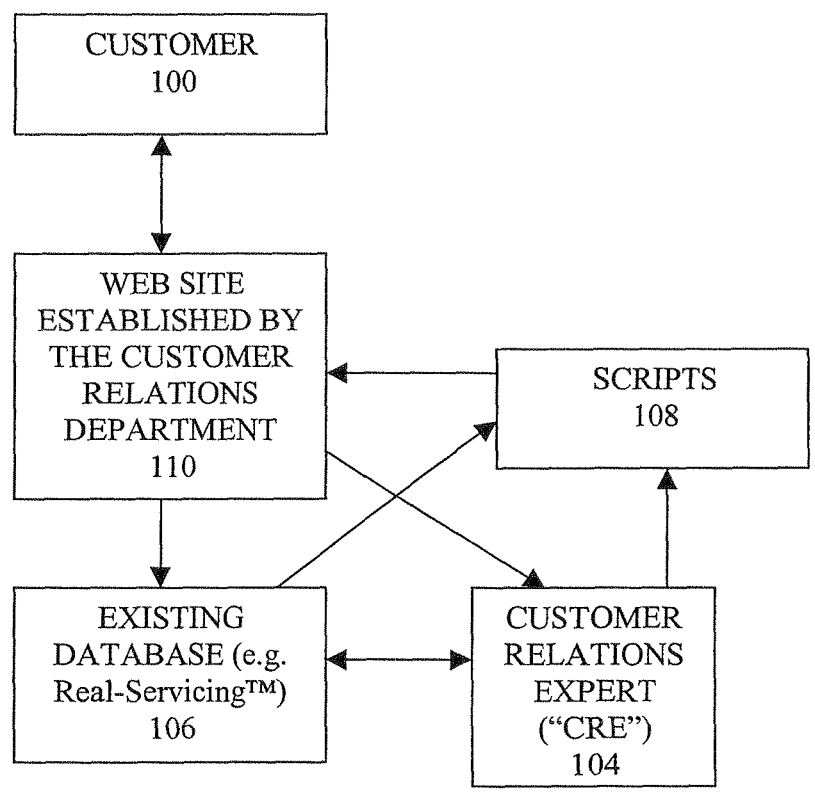
FIG. 2 is an overview flow diagram of a method and system for providing customer relations information to inquiring parties addressing issues via a web-based system, in accordance with an embodiment of the present invention.

FIG. 2 is an overview flow diagram of a method and system for providing customer relations information to inquiring parties addressing issues via a web-based system, in accordance with an embodiment of the present invention. As shown in FIG. 2, a customer or other inquiring party 100 accesses a web site 110 established by the customer relations department. The customer 100 may choose to make an inquiry.

The customer 100 activates a CRE Engine 104. This includes, for example, inputting customer information into the CRE Engine 104. The CRE Engine 104 accesses the existing database 106 to provide suggested scripts 108, in a manner similar to that discussed above in reference to FIG. 1. If the customer 100 has made an inquiry, the CRE Engine 104 provides a script responsive to the customer's inquiry. Alternatively, the CRE Engine 104 identifies likely inquiries and provides a script responsive to each. The scripts are incorporated in a readable document and sent to the customer 100 via the web.

The existing database 106 also includes, for example, a GUI desktop application used by the customer 100 to view and update customer loan information.

Figure 3:
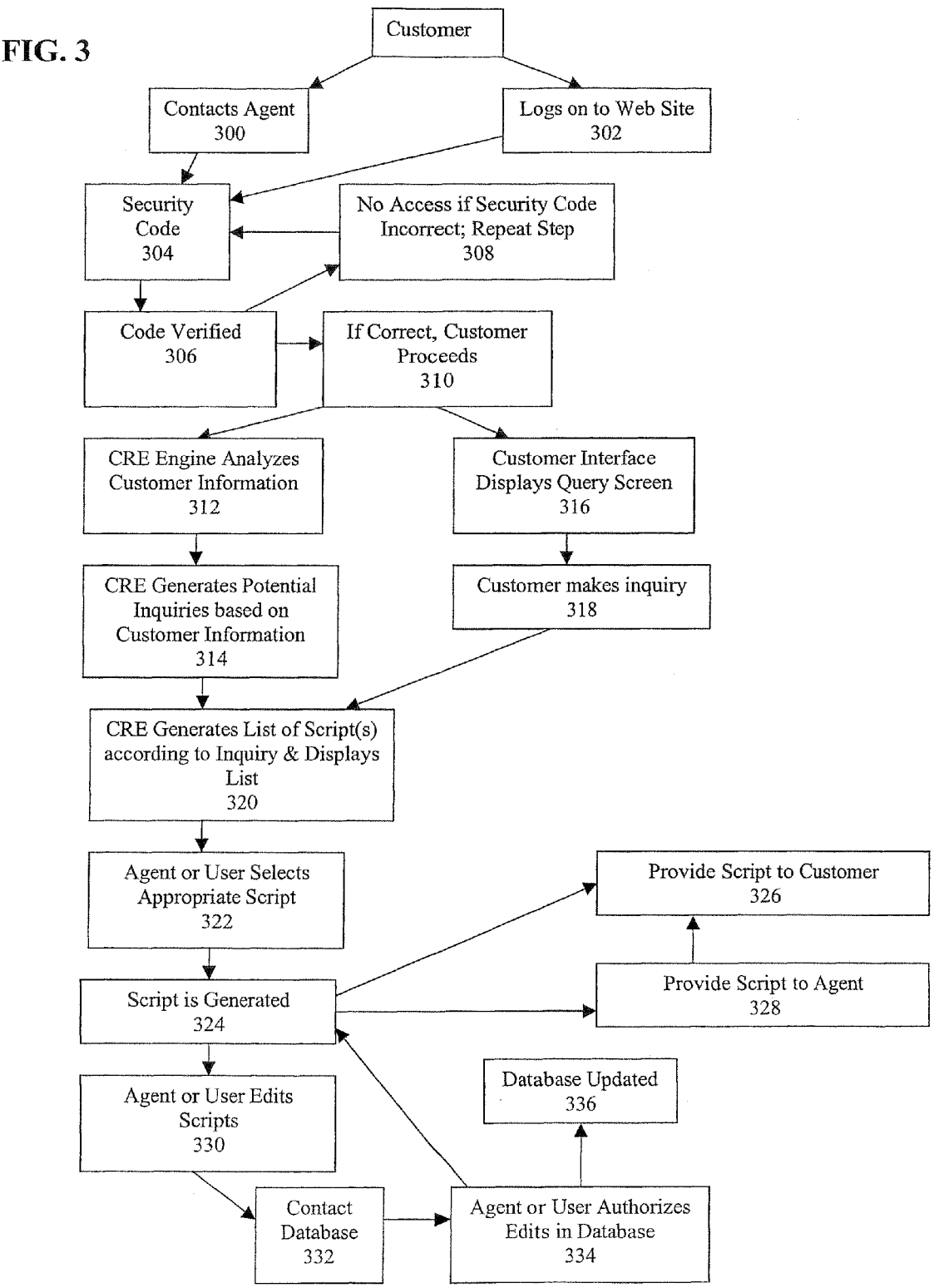
FIG. 3 is a diagram of a method and system for providing customer relations information to a customer or other inquiring party, in accordance with an embodiment of the present invention.

FIG. 3 is a diagram of a method and system for providing customer relations information to a customer or other inquiring party, in accordance with an embodiment of the present invention. As shown in FIG. 3, in one embodiment, inquiring parties, such as, for example, customers, representatives, auditors, service providers, and service receivers, contact the agent and/or the network of the customer relation department. The present invention provides agents, or other inquiring parties, with comprehensive, informative, relevant, real-time, and responsive information to answer, address, and resolve issues encountered by the inquiring party. The software allows the agents or automated software applications, such as web-based queries, to explain, identify, understand, suggest, analyze, pose, present, generate, automate, and otherwise provide issues and resolutions to inquiring parties. Issues cover any input subject matter, and may include, for example, loan information and servicing, mortgage information and servicing, consumer and business quotes, guidance and strategy, and similar type information.

The method begins when a customer or other inquiring party contacts a customer service department, such as by contacting an agent 300, logging on to a website 302, contacting an IVR system (not shown in FIG. 3), or by some other method. The customer provides identifying information 304 such as name, account number, social security number, or security code. The security code or other identifying information is verified 306. If the identifying information is incorrect 308, the method returns to step 304, and the customer again attempts to provide identifying information. If the identifying information is correct 310, the method proceeds.

In step 312, the CRE Engine analyzes customer information. The CRE Engine accesses an existing database in order to obtain the customer information. The customer information analyzed includes, for example, information about the customer or about the customer's account. Based on the results of the analysis, the CRE Engine generates potential inquires 314.

Alternatively or in addition, the customer may be presented with the opportunity to make an inquiry. For example, if the customer has logged into a customer service web site, a query screen is displayed to the customer 316, and the customer makes an inquiry 318. As another example, if the customer has telephoned a customer service department, the customer makes an inquiry of the agent, who inputs the inquiry into the CRE Engine.

The CRE Engine generates a list of one or more scripts 320. The scripts in the list are responsive to the inquiries generated in step 314 and/or the inquiries input in step 318. The list of the scripts is displayed. The customer or the agent selects an appropriate script 322, and the appropriate script is generated 324. Alternatively, each script in the list is generated in step 320.

In one embodiment, the script is displayed to the customer in step 326. The script is responsive to the customer's inquiry. In another embodiment, the script is displayed to the agent in step 328, and the agent provides information from the script to the customer 326, by reading the script over the telephone, by electronically transmitting the script to the customer, or by some other appropriate method of communication.

If the customer or the agent determines that changes are necessary in the customer's account, the agent or user edits the customer information contained in the script 330. The CRE Engine then access the existing database 332. The customer or agent authorizes changes in the existing database 334, and the database is updated 346. An updated script may also be generated 324.

Figure 4:
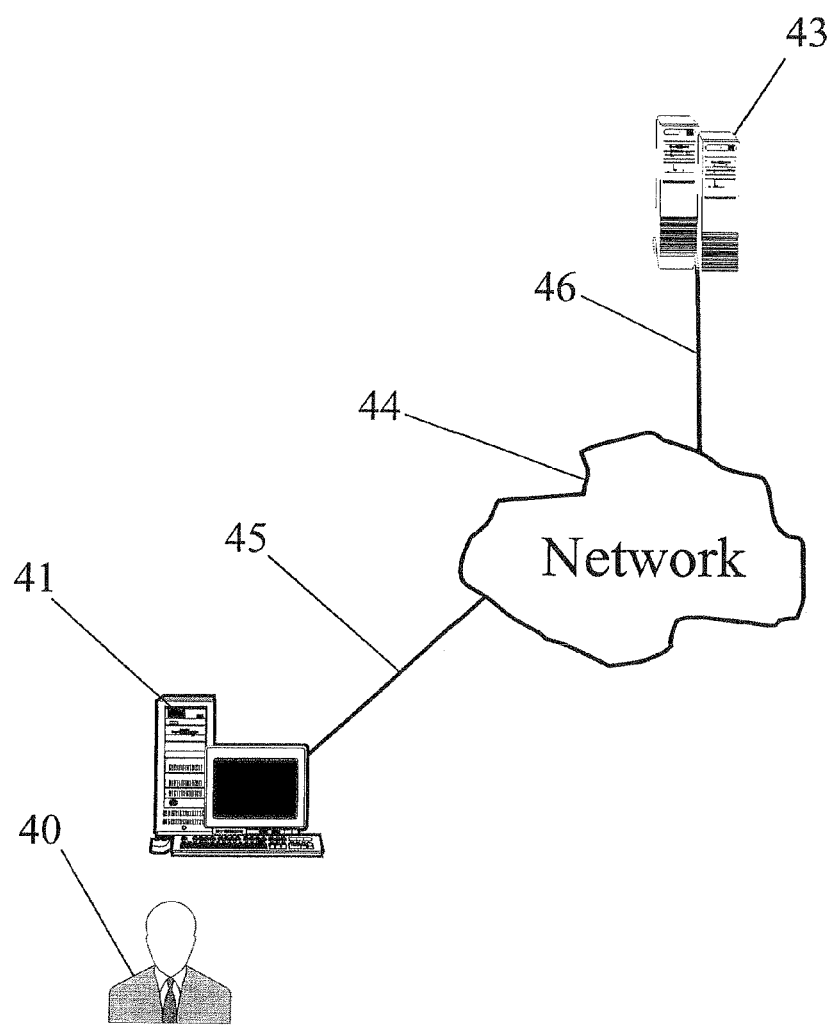
FIG. 4 presents an exemplary system diagram of various hardware components and other features, in accordance with an embodiment of the present invention.

FIG. 4 presents an exemplary system diagram of various hardware components and other features, in accordance with an embodiment of the present invention. The method of contact used in the present invention may comprise, for example, a range of methods and systems for communication, including in-person, telephone, electronic media, Internet access via a processor based terminal, and other similar methods. In one embodiment of the present invention, the method and system is implemented using IVR via telephone or other communication device.

As shown in FIG. 4, in an embodiment of the present invention, an inquiry and/or other data and other information for use in the system is, for example, input by a user 40, such as a customer or agent, via a terminal 41, such as a personal computer (PC), minicomputer, mainframe computer, microcomputer, telephone device, personal digital assistant (PDA), or other device having a processor and input capability. Inquiries may originate from domestic or international locations.

As further shown in FIG. 4, in one embodiment, the terminal 41 is coupled to a server 43, such as a PC, minicomputer, mainframe computer, microcomputer, or other device having a processor and a repository for data or connection to a repository for maintained data, via a network 44, such as the Internet, via couplings 45, 46, such as wired, wireless, or fiber optic connections.

In operation, the server processes the inquiring party's personal information, which the inquiring party provides at the initial point of contact, and identifies the inquiring party. The CRE retrieves the inquiring party's information, which is stored, for example, in a repository, such as an electronic database. The CRE presents to the inquiring party pre-selected issues based on the inquiring party's input information, or it suggests an issue and response by diagnosing the issue and formulating a solution based on information retrieved. In one embodiment, the CRE method and system involves processing based on scripting agents that use a combination of logic and scripts. Relevant and informative information is returned to the inquiring party. The CRE system ensures that relations are maintained with the inquiring party.

Benefits of the CRE method and system include enforcing consistency of information, educating inquiring parties, improving the efficiency of representatives or agents of CRE, reducing the research required to obtain information, reducing inquiry volume, and providing competent, informative, and relevant decision support. In one embodiment of the present invention, the CRE alerts agents to inquiries that are better addressed by other departments with more advanced or issue-specific training, and provides the customer relations agents with information on where and how to transfer the inquiry. In another embodiment of the invention, additional scripts are available for issues that cannot be predicted by the CRE. In such cases the agent will select a category and enter key words to receive the appropriate script(s).

One embodiment of the present invention connects the inquiring party to a network application, referred to in one embodiment as the "CRE/Web." The user contacts the CRE/Web site through an electronic interface, such as a computer and Internet connection. In a variation of this embodiment, the user may receive an automated response from the CRE system, thereby initiating the customer relations.

For instance, the user uses a web browser to access the web site of the customer relations department, and logs in to the site using identifying information and passwords, such as login names, social security numbers, telephone numbers, pin numbers, and/or other secured access codes. In a variation of this embodiment, the user enters a loan number and the last four digits of the customer's social security number to gain access to the web site concerning loan information. In one embodiment, a software application, such as an application written in ColdFusion, made by Macromedia of San Francisco, Calif., invokes a software agent (e.g., WebSpeed) to validate the information against at least one existing repository, such as REALServicing™ or another loan servicing database, to authorize access. If the validation is successful, the software application transmits a request to the software agent to retrieve the necessary data from the existing repository, which contains, for example, the user's personal information, such as loan information or medical records. This information is accessible to the user during the web session.

Synchronously, a request specifying the user's identifying code is sent to CRE via an electronic format, such as Hyper Text Transfer Protocol ("HTTP"). CRE conducts an analysis on the user information using the information in the existing repository. Upon completion of the analysis, CRE responds to the software application with a list of issues concerning the user's personal information. The issues presented to the user may be structured, for example, in order of importance or urgency, using a ranking or scoring system (e.g., based on point totals for included predetermined criteria). If no issues are identified by the CRE, a message indicating that there are no outstanding issues is displayed on the query screen.

In one implementation, the CRE identifies issues or probable inquiries as follows. An Initialization module retrieves loan data from an existing database. A Preprocessing module then computes high-level business criteria from the raw loan data retrieved by the Initialization Module. High-level business criteria are indications of the status of a customer's account, most of which are not available directly within the loan data retrieved from the customer's account. High-level business criteria are computed using logical parameters and loan data retrieved from the customer's account. Other high-level business criteria are available directly within the loan data retrieved from the customer's account, and are passed directly from the loan data without any computation.

For example, high-level business criteria may include "had-recent-speedpay," "has-escrow-record-setup," "is-newly-boarded," or "recent-arm-change." As a particular example, the Preprocessing module may compute the high-level business criterion "had-recent-speedpay." In this example, the Preprocessing module may examine the loan data retrieved from the customer's account, identify the most recent speedpay, if any, and find the date of this speedpay. The date is then evaluated to determine whether it falls within a predetermined time period, such as falling within the last two weeks. If the Preprocessing module determines that the date falls within the predetermined time period, the high-level business criterion "had-recent-speedpay" is set to "true." Other methods are possible for computing other high-level business criteria. In addition, high-level business criteria need not be Boolean variables, but may be set to any appropriate value.

The high-level business criteria are represented, for example, as attributes of a software object. In one implementation the software object is referred to as a Loan Case Object, and the results of preprocessing include an instance of the Loan Case Object with all of its attributes populated.

A Classification module is responsible for identifying the most likely issues or probable inquiries. This is accomplished using case-based reasoning, which matches the high-level business criteria with a case base of issues, which is maintained in an existing database. The results of the case-based reasoning include, for example, a list of issues from the case base of issues, each issue in the list matching at least one high-level business criterion. Each matched case also includes, for example, a match score, which represents the strength of the match. Only those issues with a match score over a predetermined threshold, for example, are returned.

The Classification module also performs some filtering of the matched cases. For example, if a particular overriding case is identified, other matches may be suppressed. As a particular example, if the issue "Active Bankruptcy" is returned with a very high score, all other issues may be suppressed. In addition, the Classification module also translates the match score for each issue into an English description that can be more easily understood by a user. The descriptions of the match score include, for example, "very high," "high," "medium," "low," and "very low."

The Dialog Management module is responsible for identifying the appropriate scripts to be provided to the agent, IVR system, or web user for each matched issue returned by the Classification Module. The Dialog Management Module uses rules to identify the appropriate scripts.

Each issue can have one or more scripts associated with it. In general, the Dialog Management Module contains one rule per script, although some scripts may contain more than one rule. Other implementations are possible.

The rule or rules for each script are used to match one or more high-level business criteria with the identified issue to derive the appropriate script to return. Each rule contains a left-hand-side, which determines when the rule should be fired; and a right-hand-side, which determines which script should be assigned to the issue when the rule is fired.

The left-hand-side of the rule includes, for example, one or more Issue Matches, which specify that the rule will only fire when this specific issue has been identified by the CRE Engine. The left-hand-side of the rule may also include one or more Presented Case Matches, which specify that certain criteria must be present in order for this specific script to be assigned. Some rules also use an exclusion statement (such as, for example, "is-escrowed-for-taxes"==TRUE) to ensure that the issue/script is not returned by the system when it is inappropriate.

The rule is used to assign a script identifier to each matched issue. Information from the raw loan data and/or the high-level business criteria may be incorporated into the script. If the user selects this script, the CRE system will use the identifier to access the script and display the content to the user.

Once a user has logged in, the user is presented with a query screen, which presents issues, probable inquiries, and/or links to scripts. The issues, probable inquiries, and/or links to scripts are those generated by the CRE that pertain to the user. To obtain more information on the issues presented, the user may link, through hyperlinks for instance, to additional information. Additionally, the user may choose to enter an issue on the query screen. In this embodiment, the user poses issues or asks questions to be resolved or answered. One embodiment of the present invention allows natural language queries or logic-based queries, such as those using Boolean parameters.

After an issue is entered via the query screen, either by selecting pre-selected issues or by manually inputting issues, for example, the web site contacts at least one existing repository, such as the database in REALServicing™, which houses the user's information. The software agent obtains the information on the existing database and displays it for the user. The user is presented with associated scripts, which are defined by a series of web pages generated to answer, address, and resolve user issues.

In one variation of this embodiment, the user manually enters or encodes updated information, such as new user data or user requests, in the script. The script may also automatically generate updated information. The updated data is then forwarded to the existing database. This process may be controlled by user authorization and confirmation. Using the updated information, the CRE generates another list of relevant issues and scripts, as previously described.

The benefits of the web-based CRE include reducing call volume, increasing satisfaction for inquiring parties, refocusing the workload of CRE agents, guiding inquiries and subsequent dialogue, educating inquiring parties, providing decision support, and other similar benefits.

In yet another embodiment of the present invention, as shown in FIG. 1, the inquiring party contacts an agent affiliated with a customer relations department. This variation of the system is generally known herein as the "CRE/CRD." The inquiring party presents the agent with an issue, for example, concerning the lending (loan and mortgage) field. Alternatively, the agent provides or suggests issues to the inquiring party.

Upon the initial contact by either the inquiring party or the agent, the agent, using the CRE system, contacts an existing repository, such as the database in REALServicing™, which is a client-server based system for managing the process of servicing residential loans for one exemplary implementation. The CRE, which works in conjunction with network-based software, such as the WebSpeed agent, accesses and updates the existing database. The CRE analyzes the inquiring party's personal information stored on the existing database, and provides the agent with a list of potential issues concerning the inquiring party. In another variation of this embodiment, the inquiring party inquires about a particular issue. The agent inputs this information in the CRE, and subsequently the CRE provides answers to the inquiry.

In one variation of the present invention, a scripting module provides tutorial type assistance to agents in the form of a dialog window that processes a pre-defined script. The window contains the complete script, including navigation and command buttons. In addition, the window contains at least one display field, which provides instructions to the agent on what to say and what to do. In one embodiment, the display field is a web browser component that allows for the use of HTML-based documents within the script. The Scripting Module is used to display the output of the CRE, and the results of the CRE are used to populate a general script template. The results include a list of the most probable issues as to why the inquiring party is making an inquiry and links to the appropriate script for each issue. The CRE produces a new list of issues and associated scripts for every request that it processes.

Figure 5:
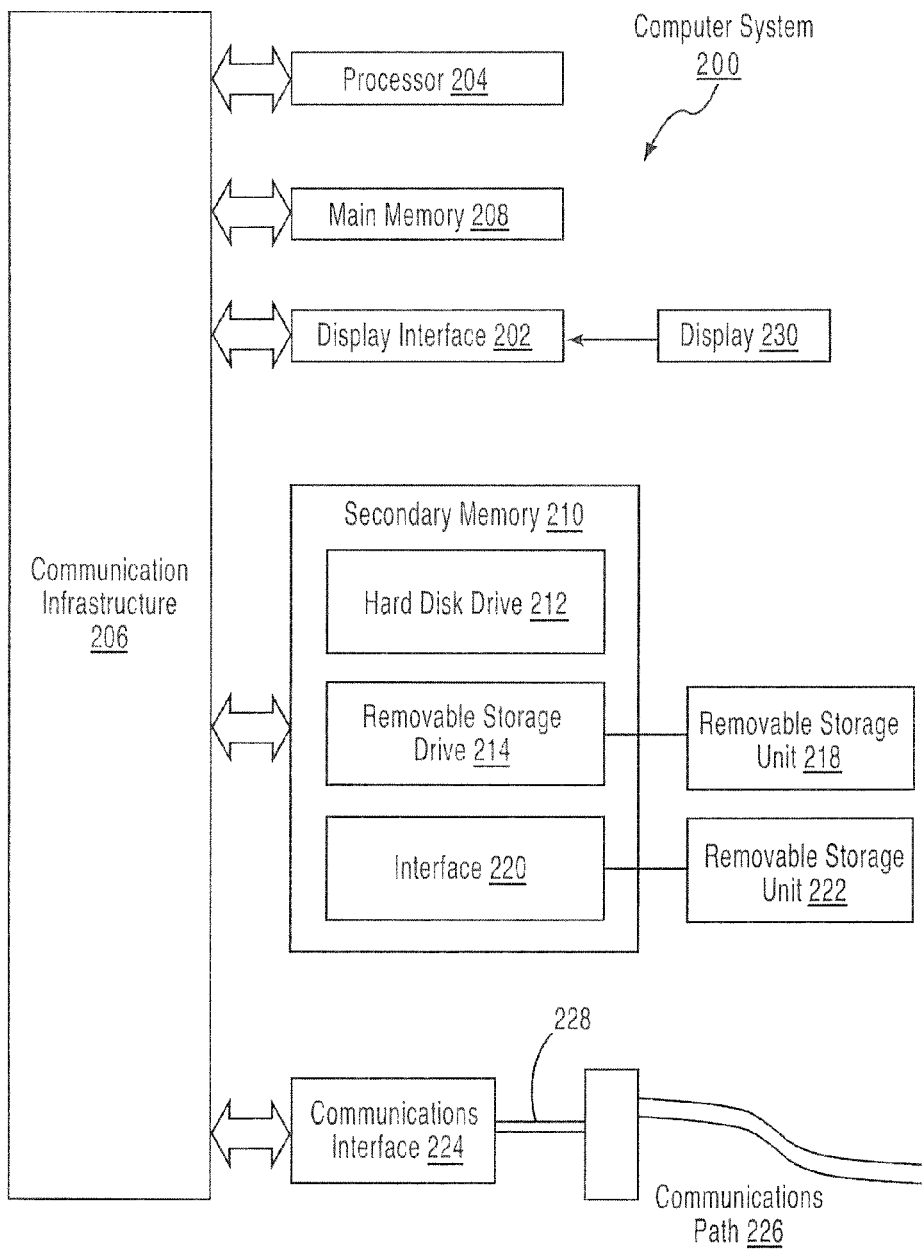
FIG. 5 presents hardware, software or a combination thereof that may be implemented in one or more computer systems or other processing systems to carry out the functionality of the present invention.

The present invention may be implemented using hardware, software or a combination thereof and may be implemented in one or more computer systems or other processing systems. In one embodiment, the invention is directed toward one or more computer systems capable of carrying out the functionality described herein. An example of such a computer system 200 is shown in FIG. 5.

Computer system 200 includes one or more processors, such as processor 204. The processor 204 is connected to a communication infrastructure 206 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 200 can include a display interface 202 that forwards graphics, text, and other data from the communication infrastructure 206 (or from a frame buffer not shown) for display on the display unit 230. Computer system 200 also includes a main memory 208, preferably random access memory (RAM), and may also include a secondary memory 210. The secondary memory 210 may include, for example, a hard disk drive 212 and/or a removable storage drive 214, representing a floppy disk drive, a magnetic tape drive, an optical disk drive, etc. The removable storage drive 214 reads from and/or writes to a removable storage unit 218 in a well known manner. Removable storage unit 218, represents a floppy disk, magnetic tape, optical disk, etc., which is read by and written to removable storage drive 214. As will be appreciated, the removable storage unit 218 includes a computer usable storage medium having stored therein computer software and/or data.

In alternative embodiments, secondary memory 210 may include other similar devices for allowing computer programs or other instructions to be loaded into computer system 200. Such devices may include, for example, a removable storage unit 222 and an interface 220. Examples of such may include a program cartridge and cartridge interface (such as that found in video game devices), a removable memory chip (such as an erasable programmable read only memory (EPROM), or programmable read only memory (PROM)) and associated socket, and other removable storage units 222 and interfaces 220, which allow software and data to be transferred from the removable storage unit 222 to computer system 200.

Computer system 200 may also include a communications interface 224. Communications interface 224 allows software and data to be transferred between computer system 200 and external devices. Examples of communications interface 224 may include a modem, a network interface (such as an Ethernet card), a communications port, a Personal Computer Memory Card International Association (PCMCIA) slot and card, etc. Software and data transferred via communications interface 224 are in the form of signals 228, which may be electronic, electromagnetic, optical or other signals capable of being received by communications interface 224. These signals 228 are provided to communications interface 224 via a communications path (e.g., channel) 226. This path 226 carries signals 228 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 214, a hard disk installed in hard disk drive 212, and signals 228. These computer program products provide software to the computer system 200. The invention is directed to such computer program products.

Computer programs (also referred to as computer control logic) are stored in main memory 208 and/or secondary memory 210. Computer programs may also be received via communications interface 224. Such computer programs, when executed, enable the computer system 200 to perform the features of the present invention, as discussed herein. In particular, the computer programs, when executed, enable the processor 204 to perform the features of the present invention. Accordingly, such computer programs represent controllers of the computer system 200.

In an embodiment where the invention is implemented using software, the software may be stored in a computer program product and loaded into computer system 200 using removable storage drive 214, hard drive 212, or communications interface 224. The control logic (software), when executed by the processor 204, causes the processor 204 to perform the functions of the invention as described herein. In another embodiment, the invention is implemented primarily in hardware using, for example, hardware components, such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

Figure 6:
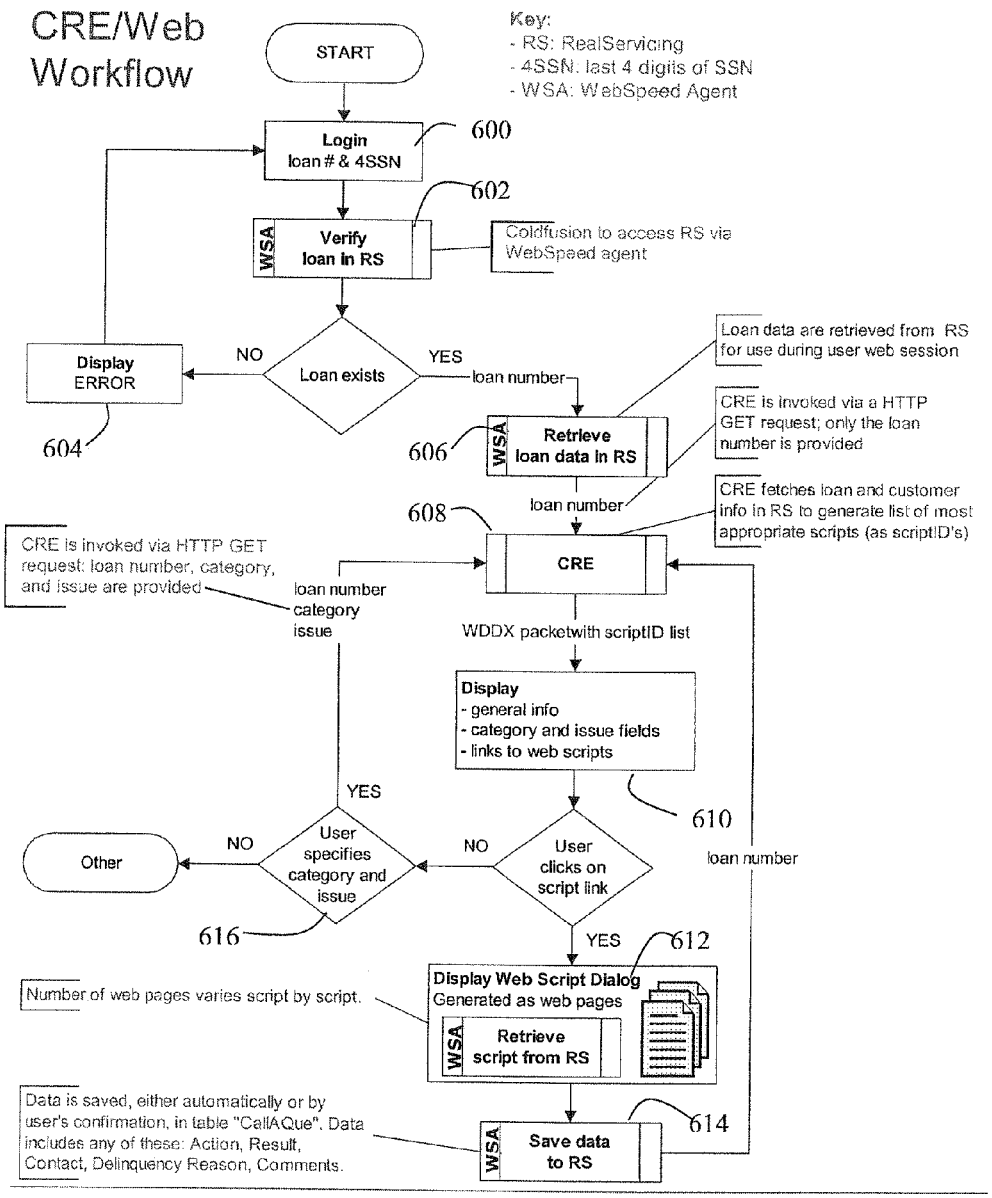
FIG. 6 presents a flow diagram of an exemplary method and system of providing customer relations information via a network, such as the Internet, in the financial lending industry, in accordance with an embodiment of the present invention.

FIG. 6 presents a flow diagram of an exemplary method and system of providing customer relations information via a network, such as the Internet, in the financial lending industry, in accordance with an embodiment of the present invention. As shown in FIG. 6, in one embodiment, inquiring parties, such as, for example, customers, representatives, auditors, service providers, and service receivers, contact the network of the customer relation department. In this embodiment, the customer is a recipient of a mortgage or other financial service. The bank or other financial services provider maintains a customer service web site that allows the customer to view and edit customer and financial information. In one embodiment, the system is implemented using a CRE Engine, ColdFusion, a WebSpeed agent, and a REALServicing™ database.

The method begins when a customer or other inquiring party logs on to a website 600 by providing the customer's loan number and the last four digits of the customer's social security number. The loan number and last four digits of the social security number are verified 602. In verifying the loan number and last four digits of the social security number, ColdFusion accesses the REALServicing™ database via the WebSpeed agent. If the identifying information is incorrect 604, an error message is displayed and the method returns to step 600. If the identifying information is correct, the method proceeds.

In step 606, the loan data are retrieved from the REALServicing™ database for use during the web session. The CRE Engine is activated, and the CRE Engine fetches loan and customer information from the REALServicing™ database. The CRE Engine analyzes the loan customer information and generates a list of one or more relevant scripts 608.

General information, information sorted by category, and the list of scripts are displayed to the customer 610. If the customer selects a script 612 from the list of scripts, the WebSpeed agent retrieves the script from the REALServicing™ database. The script is generated as a web page and displayed to the customer 612. If the customer determines that changes are necessary in the customer's account, the customer edits the customer information contained in the script. Editing the customer information may include, for example, specifying an action or a result, changing contact information, inputting a reason for delinquency, or entering comments. The WebSpeed agent saves the changes to the REALServicing™ database 614.

If the customer determines that none of the scripts in the list of scripts are appropriate, the user specifies other data, such as, for example, a loan number, category, and an inquiry or issue 616. The CRE Engine is then invoked, for example, by an HTTP request that provides information such as the loan number, category, and inquiry or issue. The method returns to step 608, wherein the CRE Engine analyzes the input information and generates a list of one or more relevant scripts 608. The customer may also take other action.

Figure 7:
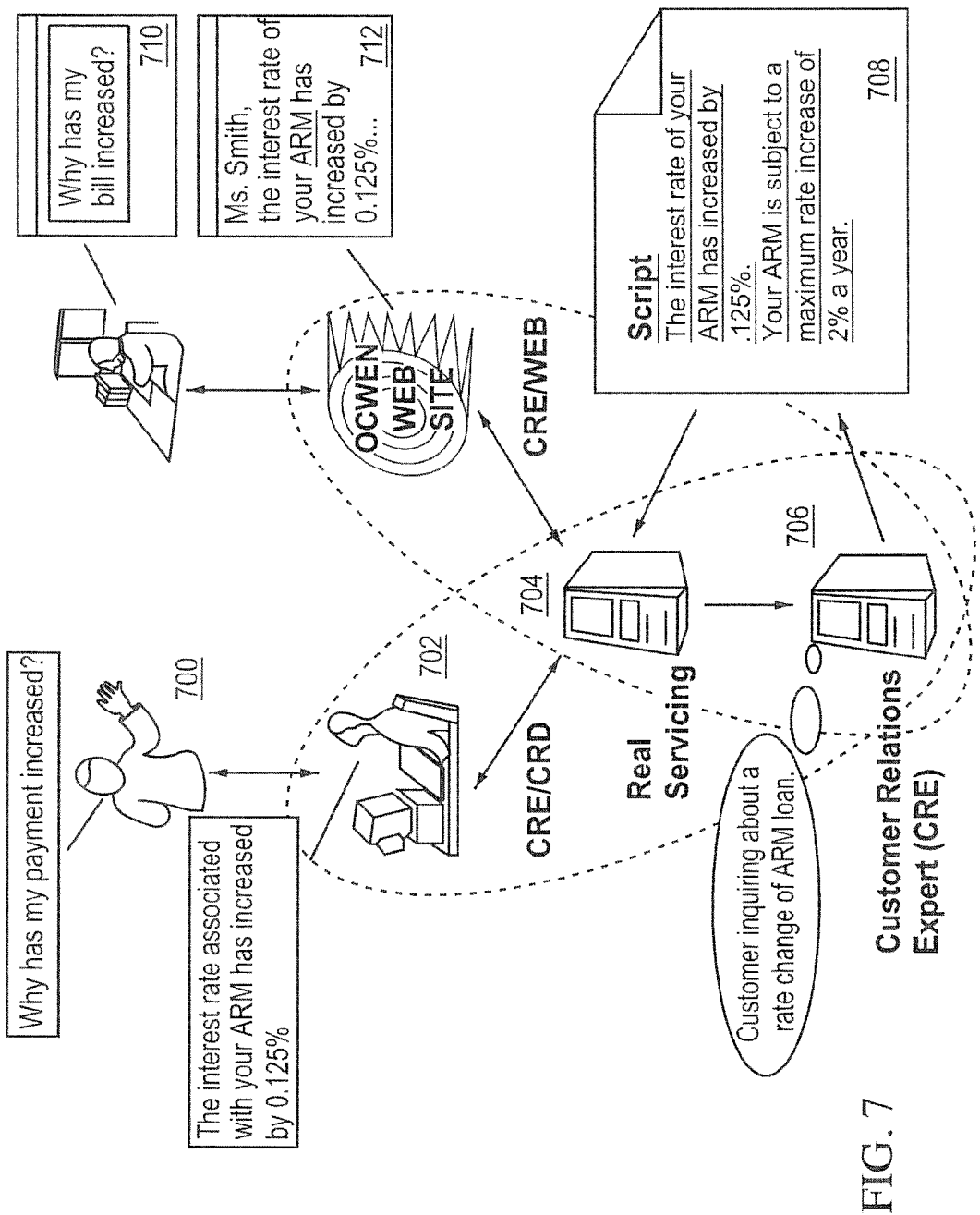
FIG. 7 presents a flow diagram of an exemplary method and system of providing customer relations information in the financial lending industry, in accordance with an embodiment of the present invention.

FIG. 7 presents a flow diagram of an exemplary method and system of providing customer relations information in the financial lending industry, in accordance with an embodiment of the present invention. A customer 700 may contact a customer service agent 702 and make an inquiry. For example, the customer may wish to know why a bill has increased. The agent 702 accesses a REALServicing™ database 704. The REALServicing™ database 704 and the CRE 706 generate a script 708 which is presented to the agent 702. The script 708 includes information responsive to the customer's inquiry. The agent provides information from the script 708 to the customer 700.

Alternatively, a customer accesses a web site 712 and inputs 710 information to obtain a response to an inquiry. For example, the customer may wish to know why a bill has increased. The REALServicing™ database 704 and the CRE 706 generate a script 708 which is displayed via the website 712. The script 708 includes information responsive to the customer's inquiry.

Figure 8:
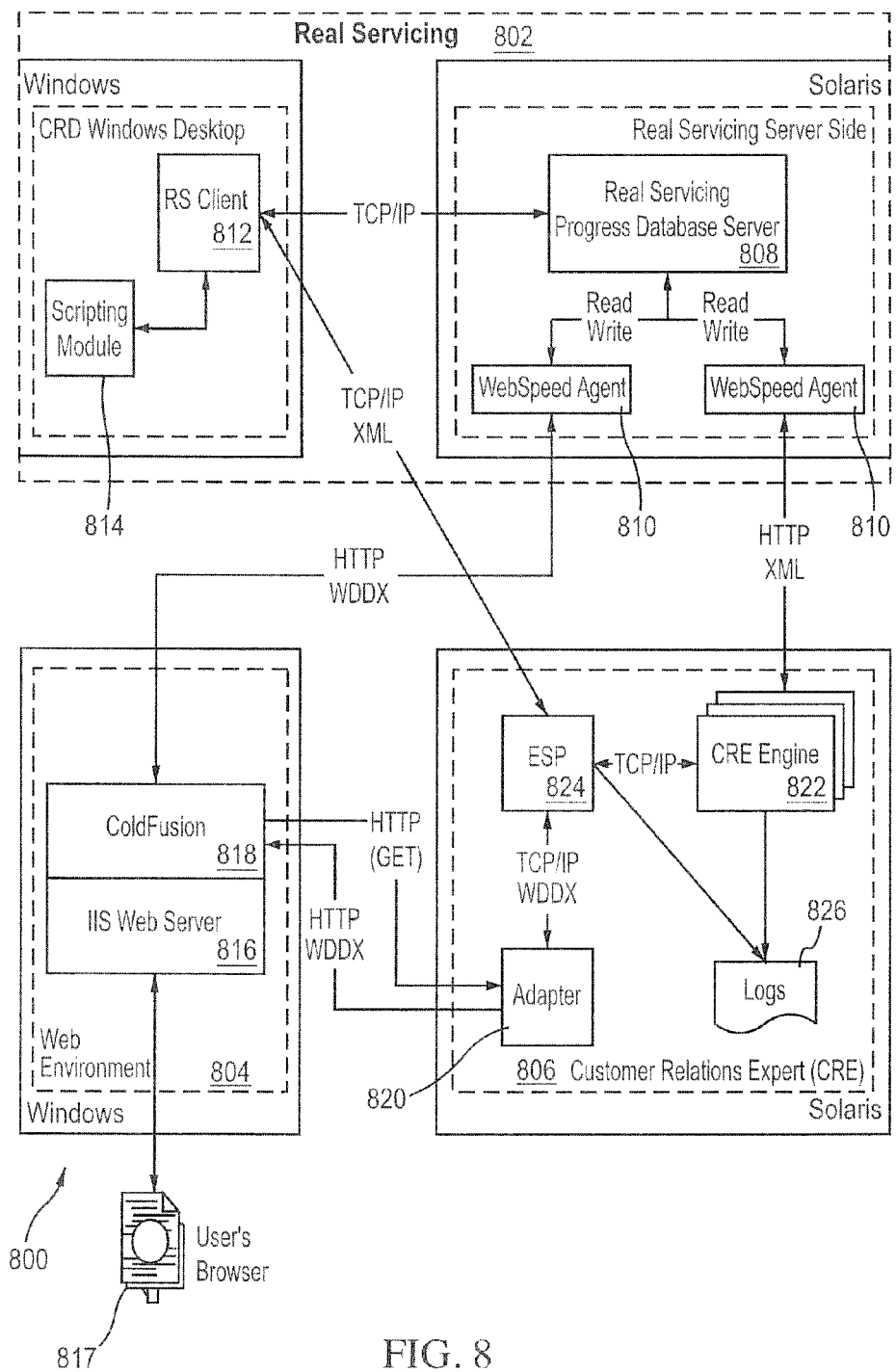
FIG. 8 presents a block diagram of a system for communication of customer relations information via a network, in accordance with an embodiment of the present invention.

FIG. 8 presents a block diagram of a system 800 for communication of customer relations information via a network, in accordance with an embodiment of the present invention. The system includes a REALServicing™ system 802, a Web environment 804, and a CRE module 806. In the embodiment illustrated in FIG. 8, the REALServicing™ system 802 is a client-server based system. On the server side, the REALServicing™ system 802 includes a REALServicing™ Progress database server 808, and one or more WebSpeed software agents 810, which access the REALServicing™ Progress database server 808. On the client side, the REALServicing™ system 802 includes a REALServicing™ client application 812 and a scripting module 814 for generating or displaying scripts. The REALServicing™ Progress database server 808 and the REALServicing™ client application 812 communicate via TCP/IP sockets, for example.

The web environment 804 includes a web server 816, which a user accesses using a web browser 817. The web environment 804 also includes a software application 818, such as an application written in ColdFusion. The software application 818 invokes the WebSpeed software agent to communicate with the REALServicing™ Progress Database Server 808.

The CRE module 806 includes an adapter 820, which provides the appropriate interface for applications to communicate with the CRE module 806. The CRE module 806 also includes a CRE Engine 822, which identifies probable inquiries and appropriate scripts. The CRE Engine 822 is responsible for receiving and parsing Extensible Markup Language (XML) requests or other requests from the REALServicing™ client 812; initiating a call to, and parsing loan data from, the WebSpeed software agent 810; classifying customer inquiries using case-based reasoning; providing a suggested script for each inquiry based on rule-based reasoning; and incorporating results into an XML document or other document, and returning the document to the requesting REALServicing™ client 812 or web browser 817. The CRE module 806 further includes an Engine Service Provider (ESP) 824, as well as one or more logs or log files 826.

Figure 9:
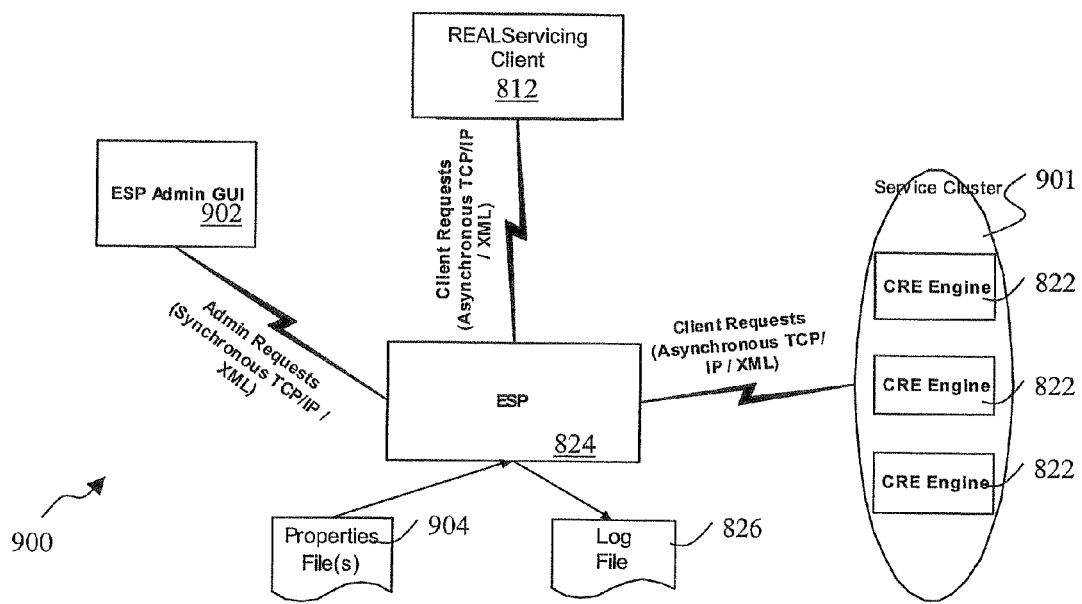
FIG. 9 presents a representative diagram of an exemplary system for communicating customer relations information, in accordance with an embodiment of the present invention.

FIG. 9 presents a representative diagram of an exemplary system 900 for communicating customer relations information, in accordance with an embodiment of the present invention. As shown in FIG. 9, one or more REALServicing™ clients 812 communicate with the ESP 824. The REALServicing™ clients 812 make XML requests using TCP/IP sockets. The ESP 824 communicates the requests to one or more instances of the CRE Engine 822. The ESP 824 is able to manage and route requests to multiple instances of the CRE Engine 822. In addition, the ESP 824 controls the loading, refreshing, and shutting down of the instances of the CRE Engine 822. The instances of the CRE Engine 822 are arranged into one or more service clusters 901.

The system 900 further includes an ESP Administrative GUI 902, which allows the administration of the control requests and specifies the configuration of the service clusters 901.

The ESP 824 is configured through the use of properties files 904. The properties files 904 specify the behavior of the ESP 824. The ESP 824 creates a log file 826, which stores information concerning the activity of the ESP 824.

FIGS. 10-21 present exemplary GUI screens that are presented to a customer service agent (agent) or other user, according to one embodiment of the present invention. In this embodiment, for example, a customer places a telephone call to an agent of a financial institution. The agent uses a CRE system to assist in providing answers to the customer's inquiries. As the agent uses the CRE system, GUI screens are displayed to the agent.

Figure 10:
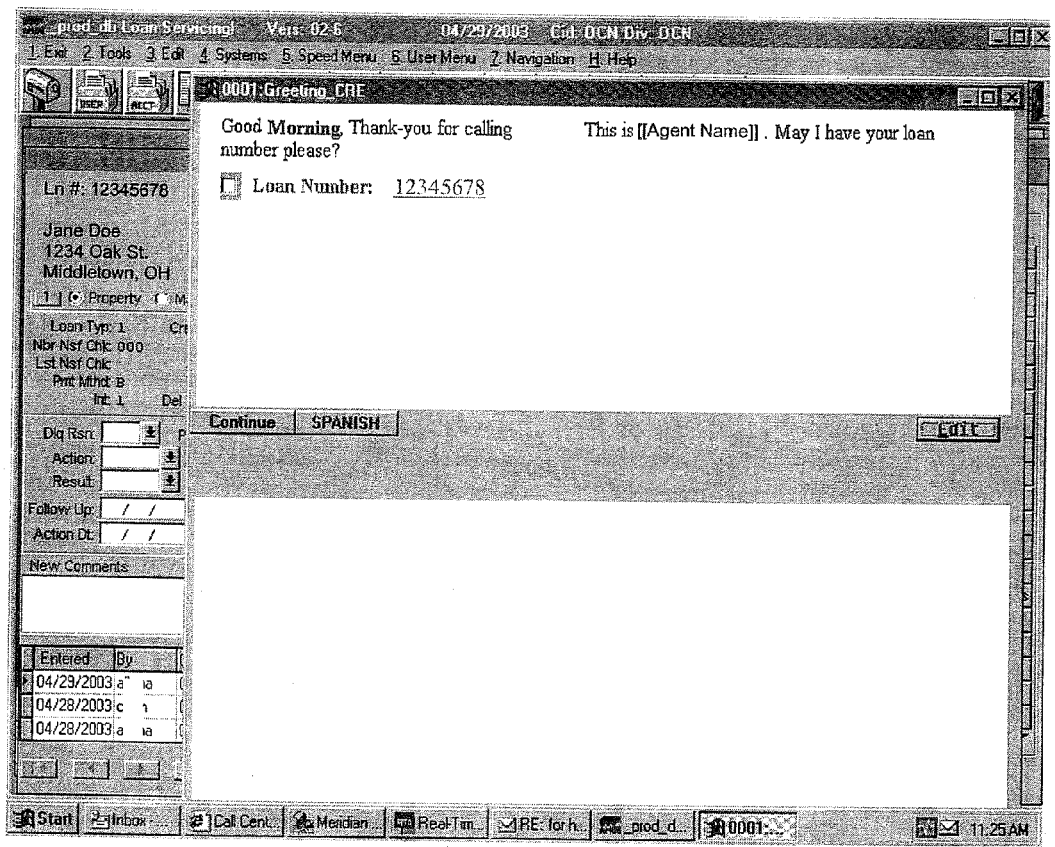
FIG. 10 presents an exemplary graphical user interface (GUI) screen, in accordance with an embodiment of the present invention.
Figure 11:
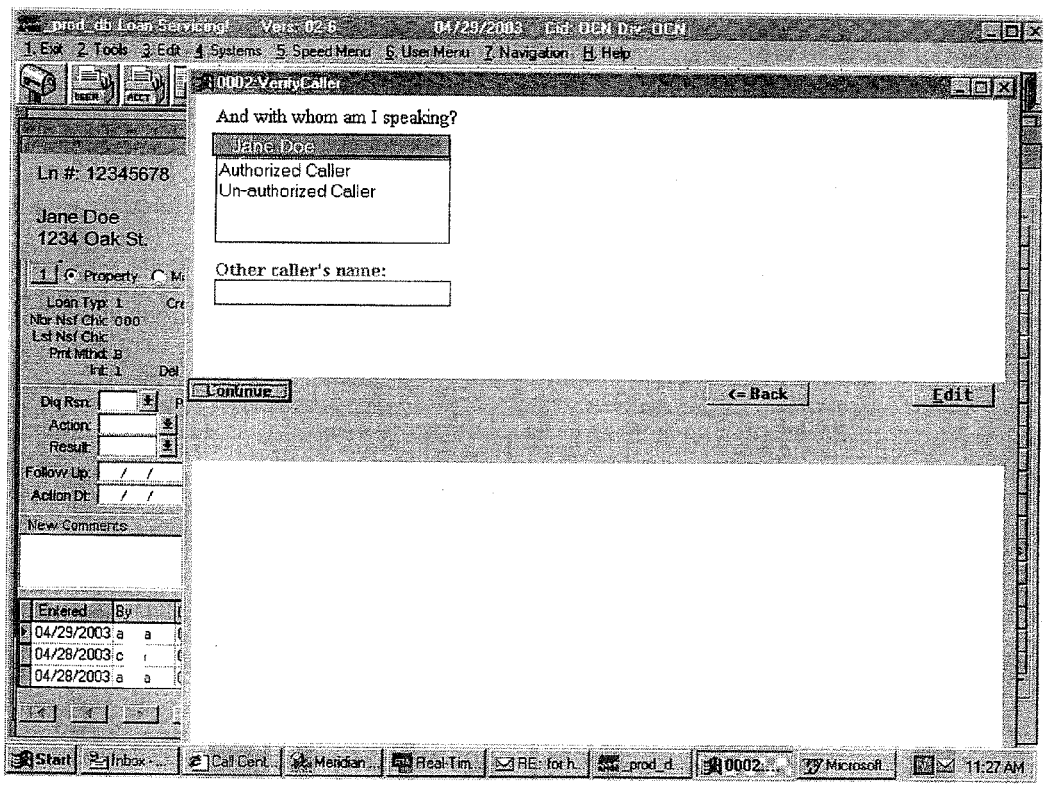
FIG. 11 presents an exemplary GUI screen, in accordance with an embodiment of the present invention.

When an agent receives a call from the customer, the agent is presented with the GUI screen 1000 shown in FIG. 10. The customer provides the loan number and the agent enters the loan number into the CRE system. The GUI screen 1100 of FIG. 11 is displayed to the agent, and the agent verifies the name of the caller.

Figure 12:
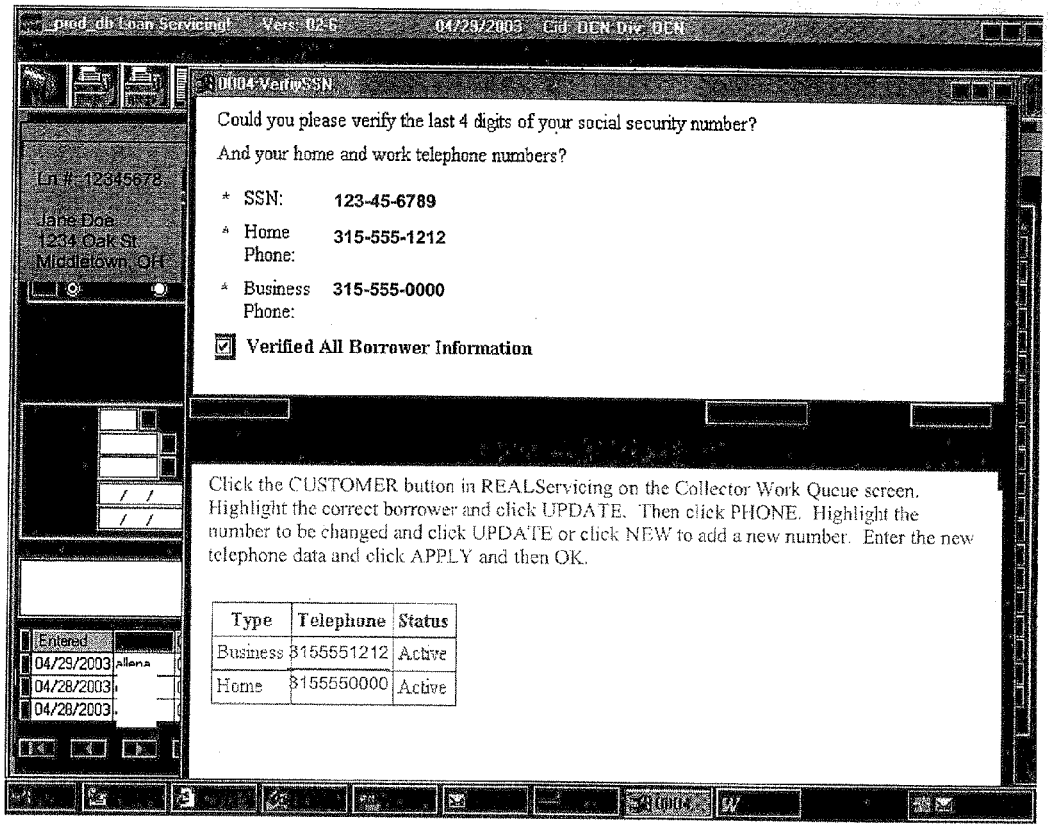
FIG. 12 presents an exemplary GUI screen, in accordance with an embodiment of the present invention.
Figure 13:
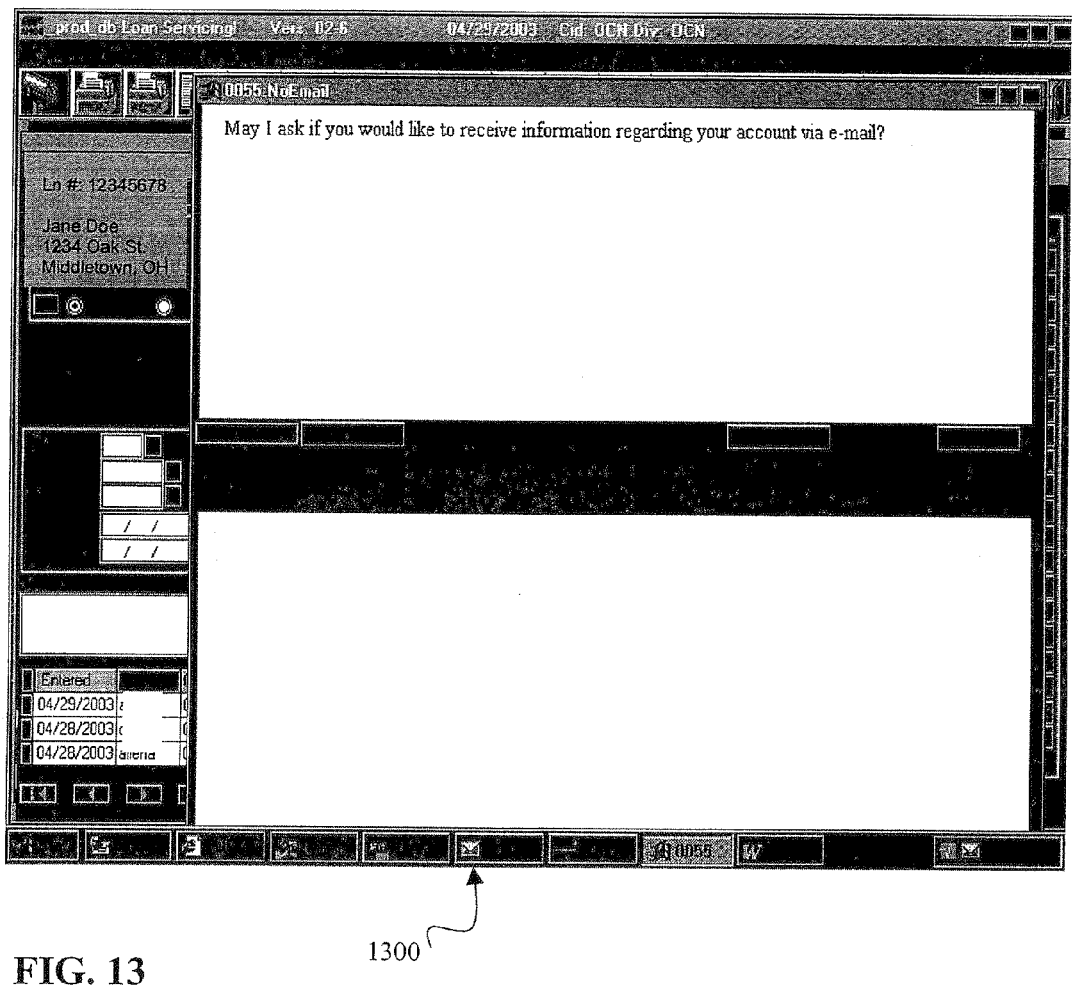
FIG. 13 presents an exemplary GUI screen, in accordance with an embodiment of the present invention.

The GUI screen 1200 of FIG. 12 is then displayed, and the agent verifies the customer's social security number, home telephone number, and work telephone number. If necessary, the agent updates information. The GUI screen 1300 of FIG. 13 is then displayed, and the agent asks whether the customer would like to receive information via email. The agent enters the customer's response.

Figure 14:
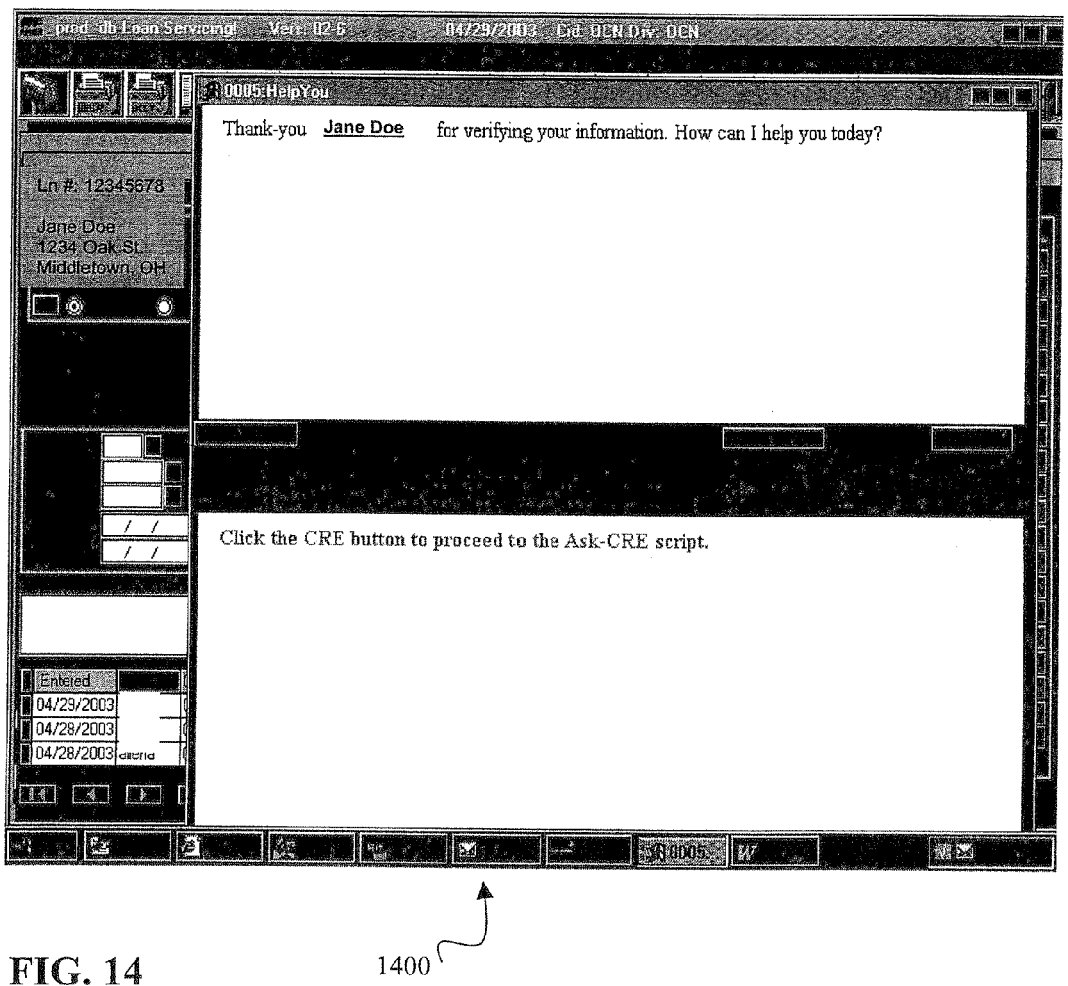
FIG. 14 presents an exemplary GUI screen, in accordance with an embodiment of the present invention.

The GUI screen 1400 of FIG. 14 is displayed, and the agent activates the CRE Engine to generate one or more scripts and/or a list of scripts.

Figure 15:
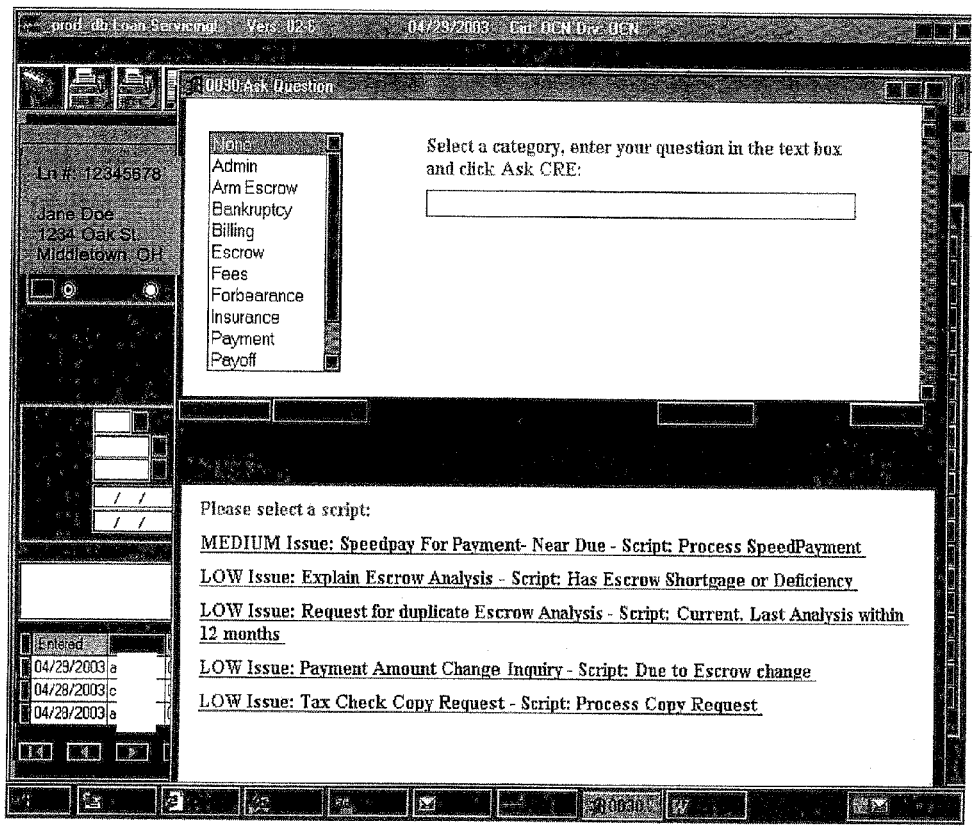
FIG. 15 presents an exemplary GUI screen, in accordance with an embodiment of the present invention.
Figure 16:
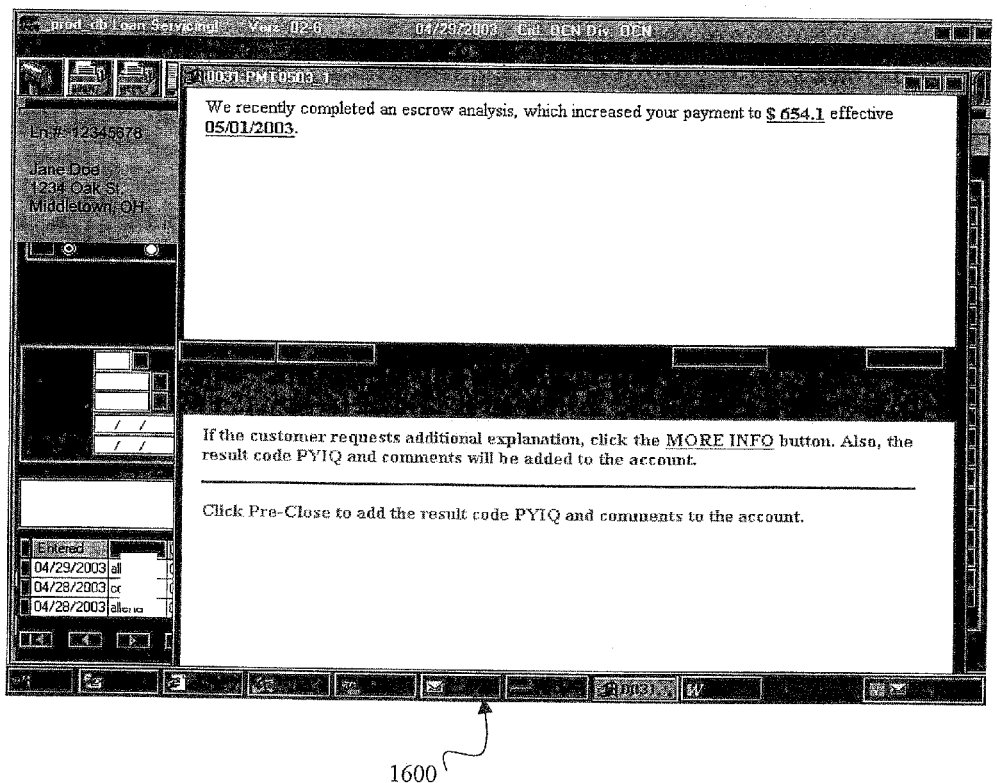
FIG. 16 presents an exemplary GUI screen, in accordance with an embodiment of the present invention.
Figure 17:
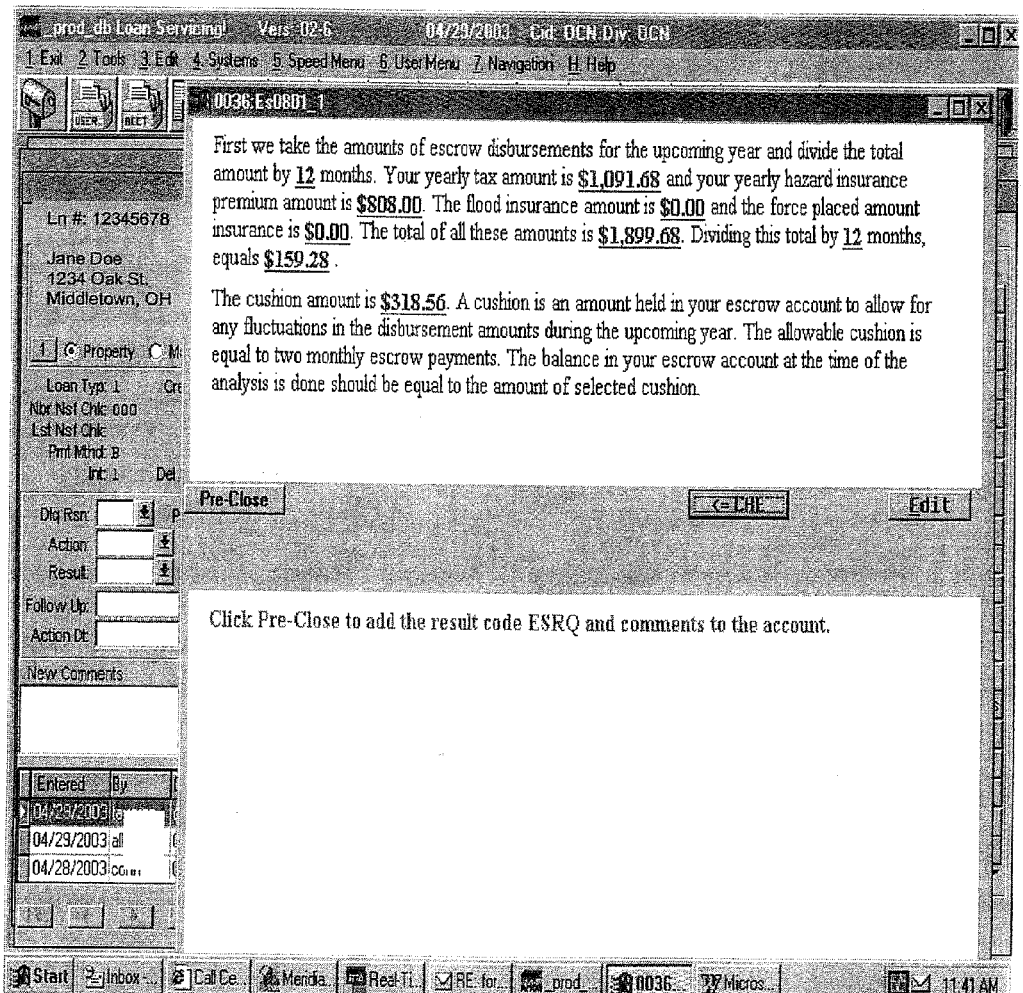
FIG. 17 presents an exemplary GUI screen, in accordance with an embodiment of the present invention.

The GUI screen 1500 of FIG. 15 is displayed. The GUI screen 1500 displays a list of scripts. The scripts in the list are responsive to probable inquiries. The agent may select a script from the list of scripts. If the agent finds an appropriate script, the agent selects the script from the list of scripts and the GUI screen 1600 of FIG. 6 is displayed. GUI screen 1600 contains the script, which includes text and specific account information. The agent reads the script to the customer. If the customer requests additional information, the agent selects "more information" and the GUI screen 1700 of FIG. 17 is displayed. GUI screen 1700 contains more detailed information responsive to the customer's inquiry.

Figure 18:
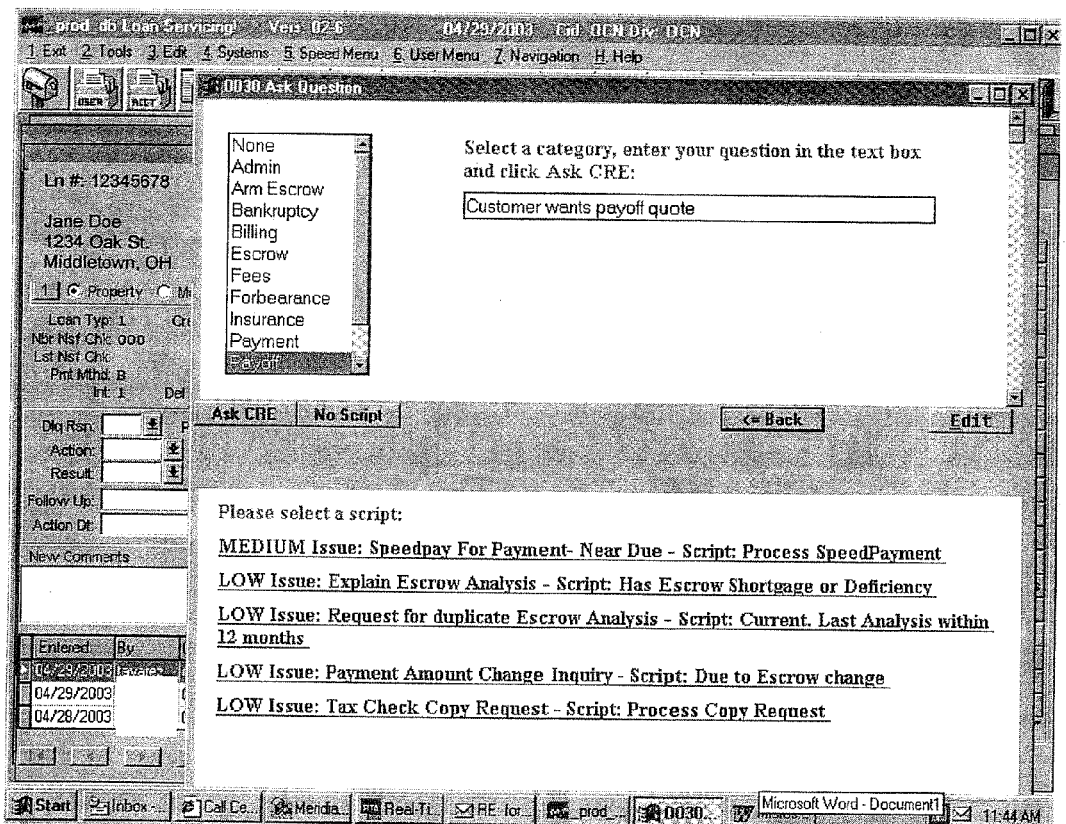
FIG. 18 presents an exemplary GUI screen, in accordance with an embodiment of the present invention.
Figure 19:
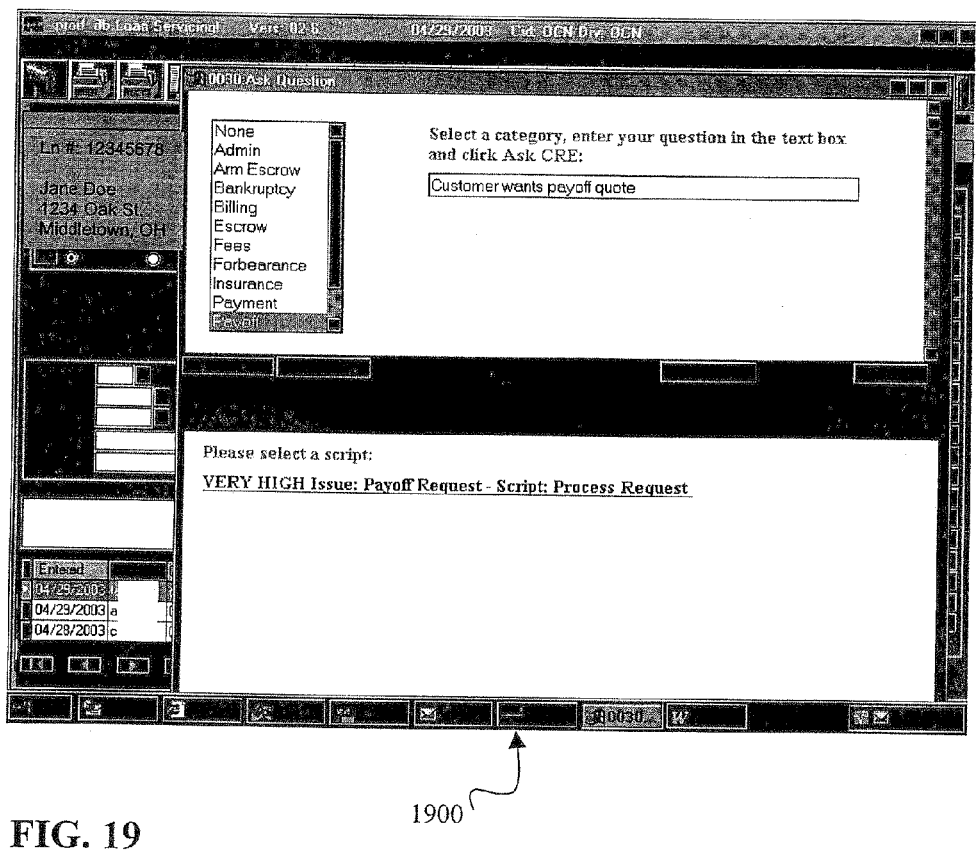
FIG. 19 presents an exemplary GUI screen, in accordance with an embodiment of the present invention.

If the agent does not find an appropriate script in the list of scripts displayed in GUI screen 1500 of FIG. 15, the agent selects a category, enters an inquiry, and re-activates the CRE Engine, as shown in GUI screen 1800 of FIG. 18. The CRE Engine generates a second list of scripts based on the category and the inquiry, as shown in the GUI screen 1900 of FIG. 19.

Figure 20:
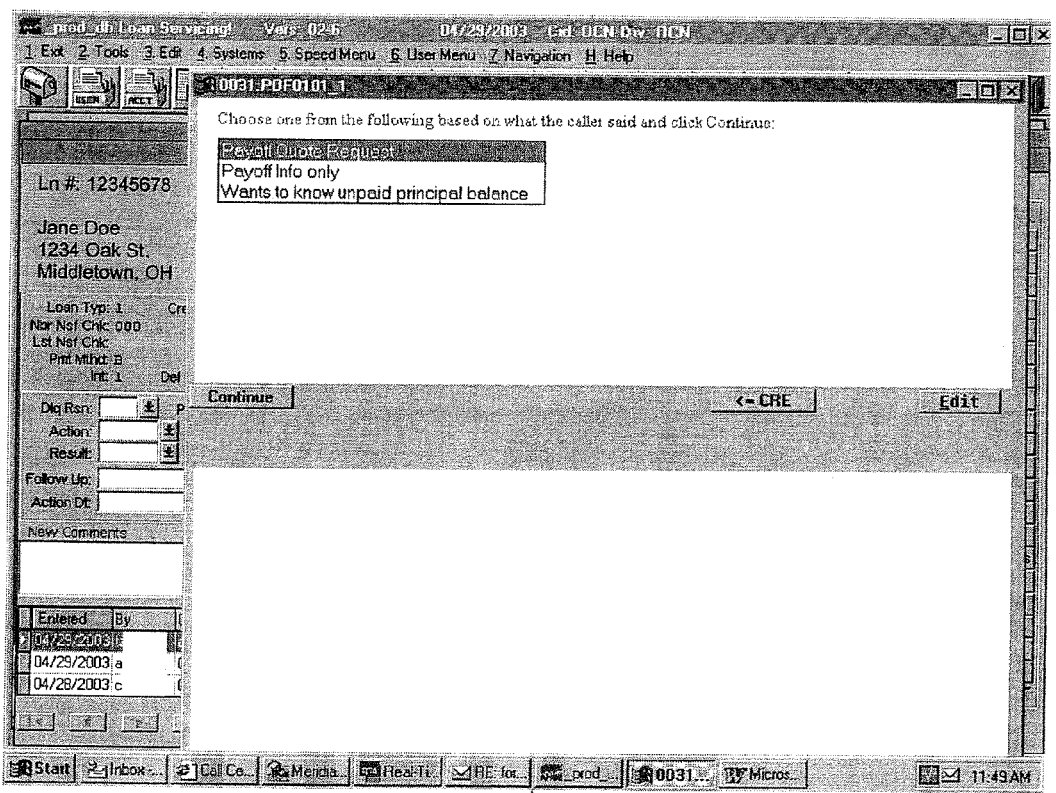
FIG. 20 presents an exemplary GUI screen, in accordance with an embodiment of the present invention.
Figure 21:
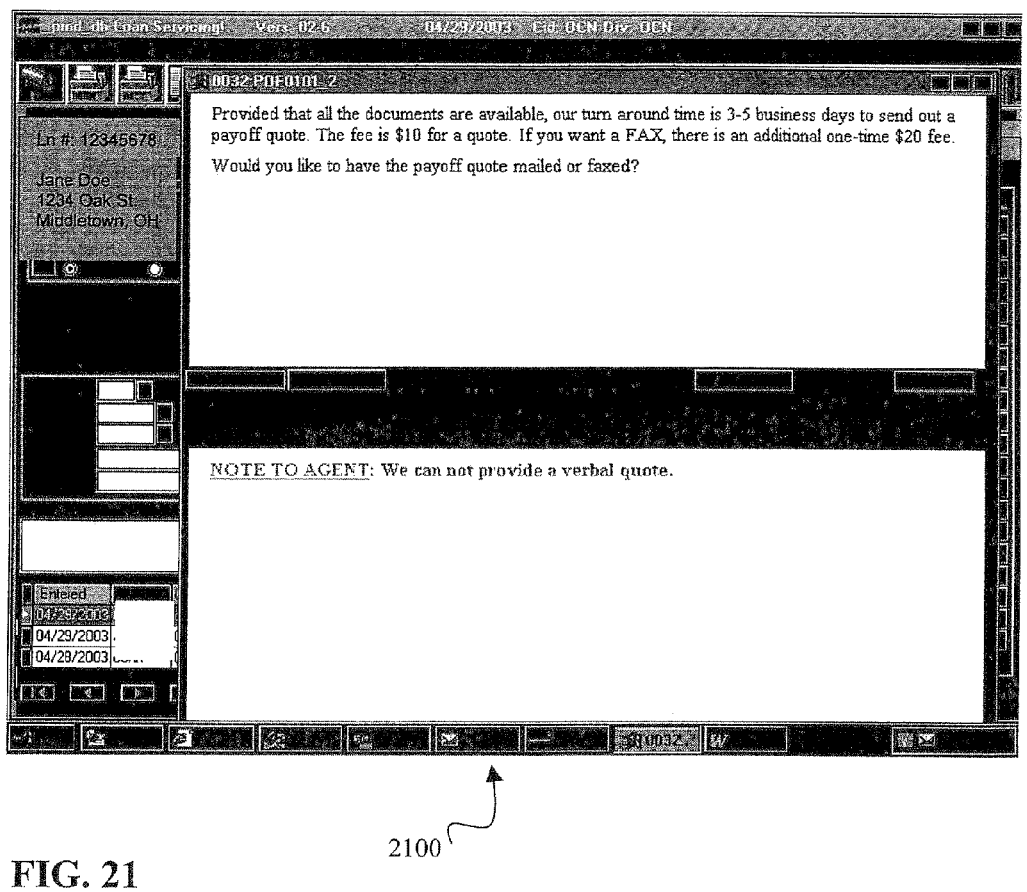
FIG. 21 presents an exemplary GUI screen, in accordance with an embodiment of the present invention.

The agent selects a script from the list of scripts and the GUI screen 2000 of FIG. 20 is displayed. GUI screen 2000 displays a sub-category of scripts from which the agent can choose based on the customer's inquiry. The agent chooses a sub-category of scripts and the GUI screen 2100 of FIG. 21 is displayed. GUI screen 2100 contains the script, which includes text and may also include specific account information. The agent reads the script to the customer, and enters the customer response into the CRE system.

Example embodiments of the present invention have now been described in accordance with the above advantages. It will be appreciated that these examples are merely illustrative of the invention. Many variations and modifications will be apparent to those skilled in the art.

What is claimed is:

1. A computer implemented method for providing customer service information, the computer comprising a processor and a data repository operatively coupled to the processor, the method comprising:

identifying a customer based on a telephone call from the customer;

accessing, via the processor, the customer's account based on results from the identifying step;

determining, via the processor, a plurality of likely reasons for the call based on information associated with the customer's account;

associating a ranking with each respective one of the plurality of likely reasons for the call;

generating, via the processor, a plurality of scripts in advance of an agent communicating with the customer, one script respectively for each of the plurality of likely reasons for the call;

prioritizing the plurality of scripts based on the ranking;

transmitting, electronically, the plurality of scripts to the agent, wherein the plurality of scripts electronically transmitted to the agent are prioritized; the agent selecting one of at least one of the plurality of scripts and a new script generated, via the processor, based on additional information provided by the customer to the agent; and the agent communicating information from the at least one selected script to the customer.

2. The method of claim 1, wherein the customer is a call center customer.

3. The method of claim 1, wherein the customer is a customer of a financial institution.

4. The method of claim 1, wherein the step of determining the one or more likely reasons for the call further comprises the step of parsing, via the processor, the customer's information stored in the repository using logic principles to classify the one or more likely reasons for the call.

5. The method of claim 4, wherein the logic principles are based on Case Based Reasoning.

6. The method of claim 1, wherein the associating a ranking step further comprises attaching a score that corresponds to the likely reason for the customer's call.

7. The method of claim 6, further comprising the step of editing, via the processor, the selected script to affect a change to the customer's account.

8. The method of claim 7, further comprising the step of updating, via the processor, the customer account information based on the changes made to the selected script.

9. A computer implemented method for providing customer service information, the computer comprising at least one processor, a data repository operatively coupled to the processor and a user interface operatively coupled to the processor, the method comprising:
identifying a customer based on the customer's contact with a service center;
accessing, via the at least one processor, the customer's account information from the data repository;
determining, via the at least one processor, a plurality of likely reasons for the customer contact based on information associated with at least one of the customer and the customer's account;
associating, via the at least one processor, a ranking with each respective one of plurality of likely reasons for the call;
generating, via the at least one processor, a plurality of scripts in advance of communicating with the customer, one script respectively for each of the plurality of likely reasons for the call;
prioritizing, via the at least one processor, the plurality of scripts based on the associated ranking, wherein the plurality of scripts displayed are prioritized;
displaying the plurality of scripts on the user interface so that one of an agent and the customer can select at least one of the plurality of scripts.

10. The method of claim 9, wherein the agent selects one of the plurality of scripts based on additional information provided by the customer.

11. The method of claim 10, wherein the agent is a live operator in the service center.

12. The method of claim 9, wherein the customer contact is made by telephone.

13. The method of claim 9, wherein the determining a plurality of likely reasons for the call further comprises:
parsing, via the at least one processor, at least one of information about the customer and information about the customer's account;
applying, via the at least one processor, logic rules to the parsed customer information to form results; and
classifying the results into the plurality of likely reasons for the call.

14. The method of claim 9, further comprising the steps of:
editing, via the at least one processor, the selected script to affect a change to the customer's account; and
updating, via the at least one processor, the customer account information based on the edits made to the script.

15. A system for providing customer service information, the system comprising:
at least one processor; memory operatively coupled to the at least one processor;
a data repository stored in the memory and accessible by the at least one processor; and
a user interface operatively coupled to the at least one processor, wherein the at least one processor is configured to:
identify a customer based on the customer's contact with a service center;
access the customer's account based on the customer's identity;
determine a plurality of likely reasons for the customer contact based on at least one of information about the customer and information associated with the customer's account;
associate a ranking with each respective one of the plurality of likely reasons for the customer contact;
generate a plurality of scripts in advance of communicating with the customer, one script respectively for each of the plurality of likely reasons for the customer contact;
prioritize the plurality of scripts based on the ranking wherein the plurality of scripts displayed on the user interface are displayed in the order of ranking from most likely to least likely to be the reason for the customer's contact; and
display the plurality of scripts on the user interface so that one of an agent and the customer can select at least one of the plurality of scripts.

16. The system of claim 15, wherein the processor is further configured to: allow the selected script to be edited to affect a change to the customer's account; and update the customer account information based on the edits made to the selected script.

17. The system of claim 15, wherein the customer contact is made by telephone.

* * * * *